United States Patent
Ma et al.

(10) Patent No.: US 10,873,276 B2
(45) Date of Patent: Dec. 22, 2020

(54) APPARATUS AND METHOD FOR HARVESTING AMBIENT ENERGY BY CIRCUIT RECONFIGURATION

(71) Applicant: University of Hawaii, Honolulu, HI (US)

(72) Inventors: Tianwei Ma, Honolulu, HI (US); Jian Yu, Honolulu, HI (US); Enze Ma, Durham, NC (US)

(73) Assignee: UNIVERSITY OF HAWAII, Honolulu, HI (US)

( * ) Notice: Subject to any disclaimer, the term of this patent is extended or adjusted under 35 U.S.C. 154(b) by 15 days.

(21) Appl. No.: 16/346,676

(22) PCT Filed: Nov. 17, 2017

(86) PCT No.: PCT/US2017/062378
§ 371 (c)(1),
(2) Date: May 1, 2019

(87) PCT Pub. No.: WO2018/094256
PCT Pub. Date: May 24, 2018

(65) Prior Publication Data
US 2019/0280620 A1    Sep. 12, 2019

Related U.S. Application Data

(60) Provisional application No. 62/424,364, filed on Nov. 18, 2016.

(51) Int. Cl.
*H02N 1/08* (2006.01)
*H02M 3/07* (2006.01)

(52) U.S. Cl.
CPC ............ *H02N 1/08* (2013.01); *H02M 3/07* (2013.01)

(58) Field of Classification Search
CPC .................... H02N 1/08; H02N 1/00–1/12
(Continued)

(56) References Cited

U.S. PATENT DOCUMENTS

2008/0048521 A1   2/2008   Mabuchi et al.
2010/0295415 A1*  11/2010  Despesse .............. H02N 1/08
                                                    310/300

(Continued)

FOREIGN PATENT DOCUMENTS

JP   2012023839 A   2/2012
JP   2013172605 A   9/2013
(Continued)

OTHER PUBLICATIONS

Achilli, A. et al., "Power generation with pressure retarded osmosis: An experimental and theoretical investigation", Journal of Membrane Science, Nov. 2009 (available online Jul. 2009), vol. 343, No. 1-2, pp. 42-52 <DOI:10.1016/j.memsci.2009.07.006>.

(Continued)

*Primary Examiner* — Thomas Truong
(74) *Attorney, Agent, or Firm* — Withrow & Terranova, P.L.L.C

(57) ABSTRACT

Apparatuses and methods for harvesting ambient energy involve repeated circuit reconfiguration. An apparatus includes a primary charge storage device, a first secondary charge storage device, a second secondary charge storage device, and switching circuitry. The switching circuitry is configured to cyclically alter connection of the first and second secondary charge storage devices between a series state and a parallel state. First and second moveable electrically conductive elements may include electrically conductive liquid droplets of materials such as water or mercury. At least one of the primary storage device, the first secondary charge storage device, or the second secondary (Continued)

charge storage device includes a capacitance that varies in response to receipt of ambient energy. Concurrently altering relative capacitance and circuit configuration results in exponential growth of harvested energy.

20 Claims, 16 Drawing Sheets

(58) Field of Classification Search
USPC .................................................. 310/300, 309
See application file for complete search history.

(56) References Cited

U.S. PATENT DOCUMENTS

| | | |
|---|---|---|
| 2010/0301699 A1 | 12/2010 | Zhang |
| 2012/0274134 A1 | 11/2012 | Gasparini et al. |
| 2013/0229087 A1 | 9/2013 | Hayashi et al. |
| 2015/0077071 A1 | 3/2015 | Fleming |
| 2015/0123513 A1 | 5/2015 | Kim et al. |
| 2016/0040648 A1 | 5/2016 | Wang et al. |
| 2018/0316280 A1* | 11/2018 | Niu .......................... H02J 7/00 |
| 2019/0280621 A1 | 9/2019 | Ma et al. |

FOREIGN PATENT DOCUMENTS

| | | |
|---|---|---|
| JP | 2015039258 A | 2/2015 |
| KR | 1020160057912 A | 5/2015 |
| WO | 2015071345 A1 | 5/2015 |
| WO | 2018102421 A1 | 6/2018 |

OTHER PUBLICATIONS

AGC, "Amorphous Fluoropolymer", AGC Chemicals: Chemistry for a Blue Planet, Jul. 2015, 19 pages.
Amin, M. et al., "Advanced Faraday cage measurements of charge and open-circuit voltage using water dielectrics", Journal of Electrostatics, Jul. 2006, vol. 64, No. 7-9, pp. 424-430 <DOI:10.1016/j.elstat.2005.10.020>.
Arnold, D., "Review of microscale magnetic power generation", IEEE Transactions in Magnetics, Nov. 2007 (date of publication: Oct. 2007), vol. 43, No. 11, pp. 3940-3951 <DOI:10.1109/TMAG.2007.906150>.
Baytekin, H. et al., "The Mosaic of Surface Charge in Contact Electrification", Science, Jul. 2011, vol. 333, No. 6040, pp. 308-312 <DOI:10.1126/science.1201512>.
Beeby, S. et al., "A micro electromagnetic generator for vibration energy harvesting", Journal of Micromechanics and Microengineering, Jun. 2007, vol. 17, No. 7, pp. 1257-1265 <DOI:10.1088/0960-1317/17/7/007>.
Beeby, S. et al., "Energy harvesting vibration sources for microsystems applications", Measurement Science and Technology, Oct. 2006, vol. 17, pp. R175-R195 <DOI:10.1088/0957-0233/17/12/R01>.
Bell, L., "Cooling, Heating, Generating Power, and Recovering Waste Heat with Thermoelectric Systems", Science, Sep. 2008, vol. 321, No. 5895, pp. 1457-1461 <DOI:10.1126/science.1158899>.
Boisseau, S. et al., "Electrostatic Conversion for Vibration Energy Harvesting", Small-Scale Energy Harvesting, Oct. 2012, Ch. 5, pp. 91-134 <DOI:10.5772/51360>.
Bowen, C. et al., "Piezoelectric and ferroelectric materials and structures for energy harvesting applications", Energy & Environmental Science, Nov. 2013, vol. 7, No. 1, pp. 25-44 <DOI:10.1039/C3EE42454E>.
Brogioli, D., "Extracting Renewable Energy from a Salinity Difference Using a Capacitor", Physical Review Letters, Jul. 2009, vol. 103, article 058501, 4 pages <DOI:10.1103/PhysRevLett.103.058501>.
Brownjohn, J. et al., "Ambient vibration survey of the bosporus suspension bridge", Earthquake Engineering and Structural Dynamics, Feb. 1989, vol. 18, No. 2, pp. 263-283 <DOI:10.1002/eqe.4290180210>.
Calió, R. et al., "Piezoelectric Energy Harvesting Solutions", Sensors, Mar. 2014, vol. 14, No. 3, pp. 4755-4790 <DOI:10.3390/s140304755>.
Chae, J. et al., "Optimum thickness of hydrophobic layer for operating voltage reduction in EWOD systems", Sensors and Actuators A: Physical, Aug. 2014, vol. 215, pp. 8-16 <DOI:10.1016/j.sna.2013.11.001>.
Choi, D. et al., "A smart pipet tip: Triboelectricity and thermoelectricity assisted in situ evaluation of electrolyte concentration", Nano Energy, Aug. 2017 (available online Jun. 2017), vol. 38, pp. 419-427 <DOI:10.1016/j.nanoen.2017.06.020>.
Cognet, V. et al., "Bioinspired turbine blades offer new perspectives for wind energy", Proceedings of the Royal Society A, Feb. 2017, vol. 473, No. 2198, 13 pages <DOI:10.1098/rspa.2016.0726>.
Conway, B. et al., "The role and utilization of pseudocapacitance for energy storage by supercapacitors", Journal of Power Sources, May-Jun. 1997, vol. 66, No. 1-2, pp. 1-14 <DOI:10.1016/S0378-7753(96)02474-3>.
Conway, B., "Transition from 'Supercapacitor' to 'Battery' behavior in electrochemical energy storage", Journal of the Electrochemical Society, Jun. 1991, vol. 138, No. 6, pp. 1539-1548 <DOI:10.1149/1.2085829>.
Cuadras, A. et al., "Thermal energy harvesting through pyroelectricity", Sensors and Actuators A: Physical, Mar. 2010 (available online Jan. 2010), vol. 158, No. 1, pp. 132-139 <DOI:10.1016/j.sna.2009.12.018>.
Disalvo, F., "Thermoelectric Cooling and Power Generation", Science, Jul. 1999, vol. 285, No. 5428, pp. 703-706 DOI:10.1126/science.285.5428.703>.
Donelan, J. et al., "Biomechanical Energy Harvesting: Generating Electricity During Walking with Minimal User Effort", Science, Feb. 2008, vol. 319, No. 5864, pp. 807-810 <DOI:10.1126/science.1149860>.
Erturk, A. et al., "An experimentally validated bimorph cantilever model for piezoelectric energy harvesting from base excitations", Smart Materials and Structures, Jan. 2009, vol. 18, No. 2, article 025009, 18 pages <DOI:10.1088/0964-1726/18/2/025009>.
Fahrenbruch, A. et al., "Fundamentals of solar cells: photovoltaic solar energy conversion", Elsevier (New York), 1983, Ch. 1, pp. 1-25.
Firestone, F., "A new analogy between mechanical and electrical systems", The Journal of the Acoustical Society of America, 1933 (published online Jun. 2005), vol. 4, pp. 248-267 <DOI:10.1121/1.1915605>.
Grätzel, M., "Photoelectrochemical cells", Nature, Nov. 2001, vol. 414, pp. 338-344 <DOI:10.1038/35104607>.
Guigon, R. et al., "Harvesting raindrop energy: experimental study", Smart Materials and Structures, Jan. 2008, vol. 17, article 015039, 6 pages <DOI:10.1088/0964-1726/17/01/015039>.
Guigon, R. et al., "Harvesting raindrop energy: theory", Smart Materials and Structures, Jan. 2008, vol. 17, article 015038, 8 pages <DOI:10.1088/0964-1726/17/01/015038>.
Halvorsen, E., "Fundamental issues in nonlinear wideband-vibration energy harvesting", Physical Review E, 2013, vol. 87, article 042129, 6 pages <DOI:10.1103/PhysRevE.87.042129>.
Helseth, L. et al., "Contact Electrification and Energy Harvesting Using Periodically Contacted and Squeezed Water Droplets", Langmuir, Mar. 2015, vol. 31, No. 10, pp. 3269-3276 <DOI:10.1021/la503494c>.
Heremans, J., "Thermoelectricity: The ugly duckling", Nature, Apr. 2014, vol. 508, pp. 327-328 DOI:10.1038/508327a>.
Horn, R. et al., "Contact Electrification and Adhesion Between Dissimilar Materials", Science, Apr. 1992, vol. 256, No. 5055, pp. 362-364 <DOI:10.1126/science.256.5055.362>.
Horn, R. et al., "Contact electrification induced by monolayer modification of a surface and relation to acid-base interactions", Nature, Dec. 1993, vol. 366, pp. 442-443 <DOI:10.1038/366442a0>.
Hunter, R. et al., "Foundations of Colloid Science", Clarendon Press, Feb. 1987, Ch. 6, pp. 316-391.
Hwang, G-T. et al., "Self-Powered Cardiac Pacemaker Enabled by Flexible Single Crystalline PMN-PT Piezoelectric Energy Har-

(56) References Cited

OTHER PUBLICATIONS vester", Advanced Materials, Apr. 2014, vol. 26, No. 28, pp. 4880-4887 <DOI:10.1002/adma.201400562>.

Jeon, S-B. et al., "3-Dimensional broadband energy harvester based on internal hydrodynamic oscillation with a package structure", Nano Energy, Oct. 2015, vol. 17, pp. 82-90 <DOI:10.1016/j.nanoen.2015.08.002>.

Karami, M. et al., "Powering pacemakers from heartbeat vibrations using linear and nonlinear energy harvesters", Applied Physics Letters, Jan. 2012, vol. 100, article 042901, 5 pages <DOI:10.1063/1.3679102>.

Kilaru, M. et al., "Strong charge trapping and bistable electrowetting on nanocomposite fluoropolymer: BaTiO3 dielectrics", Applied Physics Letters, May 2007, vol. 90, article 212906, 4 pages <DOI:10.1063/1.2743388>.

Klarman, D. et al., "A Model of Electrowetting, Reversed Electrowetting, and Contact Angle Saturation", Langmuir, Apr. 2011, vol. 27, No. 10, pp. 6031-6041 <DOI:10.1021/la2004326>.

Koka, A. et al., "Vertically aligned BaTiO3 nanowire arrays for energy harvesting", Energy & Environmental Science, 2014 (published online Oct. 2013), vol. 7, No. 1, pp. 288-296 <DOI:10.1039/C3EE42540A>.

Krupenkin, T. et al., "Reverse electrowetting as a new approach to high-power energy harvesting", Nature Communications, Aug. 2011, vol. 2, No. 448, 8 pages <DOI:10.1038/ncomms1454>.

La Mantia, F. et al., "Batteries for Efficient Energy Extraction from a Water Salinity Difference", Nano Letters, Mar. 2011, vol. 11, No. 4, pp. 1810-1813 <DOI:10.1021/nl200500s>.

Lee, S. et al., "An electrochemical system for efficiently harvesting low-grade heat energy", Nature Communications, May 2014, vol. 5, No. 3942, 6 pages <DOI:10.1038/ncomms4942>.

Li, Q. et al., "Temperature Dependence of Electrical Properties and Crystal Structure of 0.29Pb(In1/2Nb1/2)O3-0.44Pb(Mg1/3Nb2/3)O3-0.27PbTiO3 Single Crystals", Advances in Condensed Matter Physics, Oct. 2013, vol. 2013, article 382140, 5 pages <DOI:10.1155/2013/382140>.

Li, X. et al., "Hydroelectric generator from transparent flexible zinc oxide nanofilms", Nano Energy, Feb. 2017, vol. 32, pp. 125-129 <DOI:10.1016/j.nanoen.2016.11.050>.

Liliestam, J. et al., "Empirically observed learning rates for concentrating solar power and their responses to regime change", Nature Energy, Jun. 2017, vol. 2, No. 17094, 9 pages <DOI:10.1038/nenergy.2017.94>.

Lin, J-H. et al., "Single- and few-layers MoS2 nanocomposite as piezo-catalyst in dark and self-powered active sensor", Nano Energy, Jan. 2017, vol. 31, pp. 575-581 <DOI:10.1016/j.nanoen.2016.12.013>.

Lin, Z-H. et al., "Harvesting Water Drop Energy by a Sequential Contact-Electrification and Electrostatic-Induction Process", Advanced Materials, May 2014, vol. 26, No. 27, pp. 4690-4696 <DOI:10.1002/adma.201400373>.

Lin, Z-H. et al., "Water—Solid Surface Contact Electrification and its Use for Harvesting Liquid-Wave Energy", Angewandte Chemie, Nov. 2013, vol. 52, No. 48, pp. 12545-12549 <DOI:10.1002/anie.201307249>.

Lowell, J. et al., "Contact Electrification", Advances in Physics, 1980 (published online Jul. 2006), vol. 29, No. 6, pp. 947-1023 <DOI:10.1080/00018738000101466>.

Ma, T. et al., "Reaping the potentials of nonlinear energy harvesting with tunable damping and modulation of the forcing functions", Applied Physics Letters, May 2014, vol. 104, article 214104, 5 pages <DOI:10.1063/1.4879846>.

Ma, T-W. et al., "A novel parametrically excited non-linear energy harvester", Mechanical Systems and Signal Processing, Apr. 2012 (available online Feb. 2012), vol. 28, pp. 323-332 <DOI:10.1016/j.ymssp.2012.01.017>.

Meninger, S. et al., "Vibration-to-electric energy conversion", IEEE Transactions on Very Large Scale Integration Systems, Feb. 2001, vol. 9, No. 1, pp. 64-76 <DOI:10.1109/92.920820>.

Moon, J. et al., "Electrical power generation by mechanically modulating electrical double layers", Nature Communications, Feb. 2013, vol. 4, article 1487, 6 pages <DOI:10.1038/ncomms2485>.

Nie, A. et al., "Twin boundary-assisted lithium ion transport", Nano Letters, 2015 (available online Dec. 2014), vol. 15, No. 1, pp. 610-615 <DOI:10.1021/nl504087z>.

Niu, S. et al., "Theoretical study of contact-mode triboelectric nanogenerators as an effective power source", Energy & Environmental Science, Sep. 2013, vol. 6, No. 12, pp. 3576-3583 <DOI:10.1039/C3EE42571A>.

Norman, R., "Water Salination: A Source of Energy", Science, Oct. 1974, vol. 186, No. 4161, pp. 350-352 DOI:10.1126/science.186.4161.350>.

International Search Report and Written Opinion for International Patent Application No. PCT/US2017/062378, dated Mar. 12, 2018, 9 pages.

International Preliminary Report on Patentability for International Patent Application No. PCT/US2017/062378, dated May 31, 2019, 6 pages.

Post, J. et al., "Salinity-gradient power: Evaluation of pressure-retarded osmosis and reverse electrodialysis", Journal of Membrane Science, Feb. 2007, vol. 288, No. 1-2, pp. 218-230 <DOI:10.1016/j.memsci.2006.11.018>.

Radousky, H. et al., "Energy harvesting: an integrated view of materials, devices and applications", Nanotechnology, Nov. 2012, vol. 23, No. 50, article 502001, 35 pages <DOI:10.1088/0957-4484/23/50/502001>.

Rica, R. et al., "Capacitive Mixing for Harvesting the Free Energy of Solutions at Different Concentrations", Entropy, Apr. 2013, vol. 15, No. 4, pp. 1388-1407 <DOI:10.3390/e15041388>.

Rustomji, C. et al., "Liquefied gas electrolytes for electrochemical energy storage devices", Science, Jun. 2017, vol. 356, No. 6345, article eaal4263, 12 pages <DOI:10.1126/science.aal4263>.

Santos, L. et al., "Water with Excess Electric Charge", Journal of Physical Chemistry C, May 2011, vol. 115, No. 22, pp. 11226-11232 <DOI:10.1021/jp202652q>.

Sheberla, D. et al., "Conductive MOF electrodes for stable supercapacitors with high areal capacitance", Nature Materials, Feb. 2017 (published online Oct. 2016), vol. 16, pp. 220-224 <DOI:10.1038/nmat4766>.

Sterken, T. et al., "A new power MEMS component with variable capacitance", Proceedings of Pan Pacific Microelectronics Symposium (Kohala, HI, Feb. 18-20, 2003), 2003, pp. 27-34.

Sterken, T. et al., "An electret-based electrostatic /spl mu/-generator", 12th International Conference on Solid-State Sensors, Actuators and Microsystems. Digest of Technical Papers. (Boston, MA, Jun. 8-12, 2003), 2003 (date added to IEEE Xplore: Aug. 2003), 1291-1294 <DOI:10.1109/SENSOR.2003.1217009>.

Stokes, L. et al., "Renewable energy policy design and framing influence public support in the United States", Nature Energy, Jun. 2017, vol. 2, No. 17107, 6 pages <DOI:10.1038/nenergy.2017.107>.

Stootsman, J. et al., "New and Old Concepts in Thermoelectric Materials", Angewandte Chemie, Nov. 2009 (available online Oct. 2009), vol. 48, No. 46, pp. 8618-8639 <DOI:10.1002/anie.200900598>.

Swarnkar, A. et al., "Quantum dot-induced phase stabilization of α-CsPbI3 perovskite for high-efficiency photovoltaics", Science, Oct. 2016, vol. 354, No. 6308, pp. 92-95 <DOI:10.1126/science.aag2700>.

Uifilein, A. et al., "Wave and tidal current energy—A review of the current state of research beyond technology", Renewable and Sustainable Energy Reviews, May 2016, vol. 58, pp. 1070-1081 <DOI:10.1016/j.rser.2015.12.284>.

Varpula, A. et al., "Harvesting Vibrational Energy Using Material Work Functions", Scientific Reports, Oct. 2014, vol. 4, No. 6799, 9 pages <DOI:10.1038/srep06799>.

Verheijen, H. et al., "Reversible Electrowetting and Trapping of Charge: Model and Experiments", Langmuir, Sep. 1999, vol. 15, No. 20, pp. 6616-6620 <DOI:10.1021/la990548n>.

Wang, Z. et al., "Piezoelectric Nanogenerators Based on Zinc Oxide Nanowire Arrays", Science, Apr. 2006, vol. 312, No. 5771, pp. 242-246 <DOI:10.1126/science.1124005>.

(56) References Cited

OTHER PUBLICATIONS

Wang, Z. et al., "Progress in triboelectric nanogenerators as a new energy technology and self-powered sensors", Energy & Environmental Science, Jun. 2015, vol. 8, No. 8, pp. 2250-2282 <DOI:10.1039/C5EE01532D>.

Wang, Z. et al., "Triboelectric Nanogenerators as New Energy Technology for Self-Powered Systems and as Active Mechanical and Chemical Sensors", ACS Nano, Sep. 2013, vol. 7, No. 11, pp. 9533-9557 <DOI:10.1021/nn404614z>.

White, B., "Energy-Harvesting Devices: Beyond the Battery", Nature Nanotechnology, Feb. 2008, vol. 3, pp. 71-73 <DOI:10.1038/nnano.2008.19>.

Xue, G. et al., "Water-evaporation-induced electricity with nanostructured carbon materials", Nature Nanotechnology, Jan. 2017, vol. 12, pp. 317-321 <DOI:10.1038/nnano.2016.300>.

Yang, Y. et al., "Charging-free electrochemical system for harvesting low-grade thermal energy", Proceedings of the National Academy of Sciences, Nov. 2014, vol. 111, No. 48, pp. 17011-17016 <DOI:10.1073/pnas.1415097111>.

Yatsuzuka, K. et al., "Electrification phenomena of pure water droplets dripping and sliding on a polymer surface", Journal of Electrostatics, Apr. 1994, vol. 32, No. 2, pp. 157-171 <DOI:10.1016/0304-3886(94)90005-1>.

Yin, J. et al., "Generating electricity by moving a droplet of ionic liquid along graphene", Nature Nanotechnology, Apr. 2014, vol. 9, pp. 378-383 <DOI:10.1038/nnano.2014.56>.

Yin, J. et al., "Waving potential in graphene", Nature Communications, May 2014, vol. 5, No. 3582, 6 pages <DOI:10.1038/ncomms4582>.

Yu, J. et al., "Exponential energy harvesting through repetitive reconfigurations of a system of capacitors", Communications Physics, Mar. 2018, vol. 1, No. 9, 10 pages <DOI:10.1038/s42005-018-0010-y>.

Yu, J. et al., "Harvesting energy from low-frequency excitations through alternate contacts between water and two dielectric materials", Scientific Reports, Dec. 2017, vol. 7, article 17145, 9 pages <DOI:10.1038/s41598-017-17522-8>.

Zhang, J. et al., "Superhydrophobic PTFE Surfaces by Extension", Macromolecular Rapid Communications, Jun. 2004 (first published May 2004), vol. 25, No. 11, pp. 1105-1108 <DOI:10.1002/marc.200400065>.

Zhu, G. et al., "Toward Large-Scale Energy Harvesting by a Nanoparticle-Enhanced Triboelectric Nanogenerator", Nano Letters, Jan. 2013, vol. 13, No. 2, pp. 847-853 <DOI:10.1021/nl4001053>.

Zuo, L. et al., "Energy Harvesting, Ride Comfort, and Road Handling of Regenerative Vehicle Suspensions", Journal of Vibration and Acoustics, Feb. 2013, vol. 135, No. 1, article 011002, 8 pages <DOI:10.1115/1.4007562>.

International Search Report and Written Opinion for International Patent Application No. PCT/US2017/063726, dated Mar. 12, 2018, 9 pages.

International Preliminary Report on Patentability for International Patent Application No. PCT/US2017/063726, dated Jun. 13, 2019, 6 pages.

Notice of Allowance for U.S. Appl. No. 16/346,679, dated Jul. 24, 2020, 9 pages.

\* cited by examiner

APPARATUS AND METHOD FOR HARVESTING AMBIENT ENERGY BY CIRCUIT RECONFIGURATION

RELATED APPLICATIONS

This application is a 35 U.S.C. § 371 national phase filing of International Application No. PCT/US2017/062378 filed Nov. 17, 2017, and claims the benefit of U.S. Provisional Patent Application No. 62/424,364 filed Nov. 18, 2016, wherein the entire contents of the foregoing applications are hereby incorporated by reference herein.

GOVERNMENT RIGHTS IN THE INVENTION

This invention was made with government support under CMMI0758632 awarded by the National Science Foundation and under DOT-10-030 awarded by the U.S. Department of Transportation. The government has certain rights in the invention.

TECHNICAL FIELD

This disclosure relates to energy harvesting. In particular, the present disclosure relates to systems and methods for harvesting ambient energy by circuit reconfiguration.

BACKGROUND

There is a growing need for reliable, in situ power generation in various applications. In particular, there has been increased interest in harvesting energy from the ambient environment. However, when the level of environmental energy is fixed, current technologies only extract energy at a constant rate, such that the growth of the harvested energy is bounded by a linear function. Consequently, in low-level ambient sources, the extraction rate usually becomes too low to be of practical use.

Most energy harvesting techniques are confined by strict requirements as to the types of input energy to be harvested and output energy to be generated, as dictated by transduction mechanisms. For example, solar cells rely on the photovoltaic effect to generate electricity from solar energy, thermoelectric generators utilize the thermoelectric effect to generate electricity from heat, piezoelectric generators require material deformations to generate electricity, and electromagnetic generators rely on electromagnetic induction to generate electricity. Accordingly, many energy-harvesting techniques are limited in the types of energy to be harvested and, as a result, are also limited in their use and application.

In other techniques, external devices with supporting circuitry are required for the storage of harvested energy. For example, in piezoelectric or electromagnetic generators, the working principles only allow for generating AC current, which requires rectifiers, batteries, and/or capacitors to enable harvested energy to be stored for later use. This additional, required circuitry dramatically reduces energy harvesting efficiency, and sets a relatively high threshold of the level of energy that can be harvested. For ambient energy, which is usually of low level, the amount of electricity generated with current technology can hardly pass the threshold to make it useful.

Thus, current techniques are limited by low efficiency and energy loss such that they cannot efficiently and effectively harvest low-level ambient energy.

SUMMARY

Provided herein, by way of certain exemplary embodiments, are systems, apparatuses, and methods for harvesting ambient energy by circuit reconfiguration. In particular, an apparatus includes a primary charge storage device, a first secondary charge storage device, a second secondary charge storage device, and switching circuitry. In certain aspects, the switching circuitry is adapted to cyclically alter connection of the first and second secondary charge storage devices between a series state and a parallel state. One or more of a primary storage device, a first secondary charge storage device, or a second secondary charge storage device includes a capacitance that varies in response to receipt of ambient energy. Concurrently alteration of relative capacitance between the foregoing items and alteration of circuit configuration results in exponential energy growth, thereby enabling ambient energy to be harvested efficiently and effectively. Alteration of a circuit configuration may include switching a connection between first and second secondary charge storage devices from a parallel state to a series state, or vice-versa. A first amount of charge may be transferred from the primary charge storage device to the first and second secondary charge storage devices when the connection between the first and second secondary charge storage is in one state, and a second amount of charge (which exceeds the first amount of charge) may be transferred from the first and second secondary charge storage devices to the primary charge storage device when the connection between the first the first and second secondary charge storage is in another state. During at least a portion of the foregoing actions, relative capacitance between the primary charge storage device and at least one of the secondary charge storage devices is altered.

In one aspect, an apparatus for harvesting ambient energy includes a primary charge storage device, a first secondary charge storage device, a second secondary charge storage device, and switching circuitry. The switching circuitry is adapted to cyclically alter a connection of the first and second secondary charge storage devices between a series state and a parallel state. At least one of the primary storage device, the first secondary charge storage device, or the second secondary charge storage device includes a capacitance that varies in response to receipt of ambient energy. The apparatus is further configured to accumulate, in the primary charge storage device, charge received from the first and second secondary charge storage devices when connected in the parallel state. The apparatus is configured to accumulate, in the first and second secondary charge storage devices when connected in the series state, charge received from the primary charge storage device.

In certain embodiments, at least one of the primary charge storage device, the first secondary charge storage device, or the second secondary charge storage device includes a capacitor. In certain embodiments, the primary charge storage device includes a capacitance that varies in response to receipt of ambient energy. In certain embodiments, at least one of the first secondary charge storage device or the second secondary charge storage device includes a capacitance that varies in response to receipt of ambient energy. In certain embodiments, each of the first secondary charge storage device and the second secondary charge storage device comprises a capacitance that varies in response to receipt of ambient energy. In certain embodiments, each of the primary charge storage device, the first secondary charge storage device, and the second secondary charge storage device includes a capacitance that varies in response to receipt of ambient energy.

In certain embodiments, transition between the series state and the parallel state of the switching circuitry is responsive to an electrical signal. In certain embodiments, transition between the series state and the parallel state of the switching circuitry is responsive to a non-electrical input. In certain embodiments, the non-electrical input is derived from the ambient energy. In certain embodiments, the switching circuitry comprises first and second moveable electrically conductive elements. In certain embodiments, the first and second moveable electrically conductive elements comprise electrically conductive liquid droplets. In certain embodiments, each of the first and second moveable electrically conductive liquid droplets moves in response to receipt of ambient energy. In certain embodiments, the electrically conductive liquid droplets comprise water or mercury.

In certain embodiments, the apparatus is configured for harvesting ambient energy comprising mechanical or acoustic vibrations. In certain embodiments, the apparatus is configured for harvesting ambient energy comprising thermal energy. In certain embodiments, the apparatus is configured for harvesting ambient energy comprising electrochemical energy.

In another aspect, a method for harvesting ambient energy utilizing a primary storage device, a first secondary charge storage device, and a second secondary charge storage device is disclosed. The method includes altering, in response to receipt of ambient energy, relative capacitance between (i) the primary storage device and (ii) at least one of the first secondary charge storage device or the second secondary charge storage device, to increase capacitance of (i) the primary storage device relative to (ii) at least one of the first secondary charge storage device or the second secondary charge storage device. The method further includes switching a connection between the first and second secondary charge storage devices from a parallel state to a series state. The method further includes transferring charge in a first amount from the primary charge storage device to the first and second secondary charge storage devices. The method further includes altering, in response to receipt of ambient energy, relative capacitance between (i) the primary storage device and (ii) at least one of the first secondary charge storage device or the second secondary charge storage device, to decrease capacitance of (i) the primary storage device relative to (ii) at least one of the first secondary charge storage device or the second secondary charge storage device. The method further includes switching a connection between the first and second secondary charge storage devices from a series state to a parallel state. The method further includes transferring charge in a second amount from the first and second secondary charge storage devices to the primary charge storage device, wherein the second amount of charge is greater than the first amount of charge.

In certain embodiments, the altering of relative capacitance between (i) the primary charge storage device and (ii) at least one of the first secondary charge storage device or the second secondary charge storage device, to increase capacitance of (i) the primary storage device relative to (ii) at least one of the first secondary charge storage device or the second secondary charge storage device, includes increasing capacitance of the primary charge storage device. The altering of relative capacitance between (i) the primary storage device and (ii) at least one of the first secondary charge storage device or the second secondary charge storage device, to decrease capacitance of (i) the primary storage device relative to (ii) at least one of the first secondary charge storage device or the second secondary charge storage device, includes decreasing capacitance of the primary charge storage device.

In certain embodiments, the altering of relative capacitance between (i) the primary charge storage device and (ii) at least one of the first secondary charge storage device or the second secondary charge storage device, to increase capacitance of (i) the primary storage device relative to (ii) at least one of the first secondary charge storage device or the second secondary charge storage device, comprises decreasing capacitance of at least one of the first secondary charge storage device or the second secondary charge storage device. The altering of relative capacitance between (i) the primary storage device and (ii) at least one of the first secondary charge storage device or the second secondary charge storage device, to decrease capacitance of (i) the primary storage device relative to (ii) at least one of the first secondary charge storage device or the second secondary charge storage device includes increasing capacitance of at least one of the first secondary charge storage device or the second secondary charge storage device.

In certain embodiments, the altering of relative capacitance between (i) the primary charge storage device and (ii) at least one of the first secondary charge storage device or the second secondary charge storage device, to increase capacitance of (i) the primary storage device relative to (ii) at least one of the first secondary charge storage device or the second secondary charge storage device, includes decreasing capacitance of both of the first secondary charge storage device and the second secondary charge storage device. The altering of relative capacitance between (i) the primary storage device and (ii) at least one of the first secondary charge storage device or the second secondary charge storage device, to decrease capacitance of (i) the primary storage device relative to (ii) at least one of the first secondary charge storage device or the second secondary charge storage device, includes increasing capacitance of both of the first secondary charge storage device and the second secondary charge storage device.

In certain embodiments, any two or more of the foregoing aspects and/or features disclosed herein may be combined for additional advantage.

Those skilled in the art will appreciate the scope of the present disclosure and realize additional aspects thereof after reading the following detailed description of the certain exemplary embodiments in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure.

DETAILED DESCRIPTION

Figure 1:
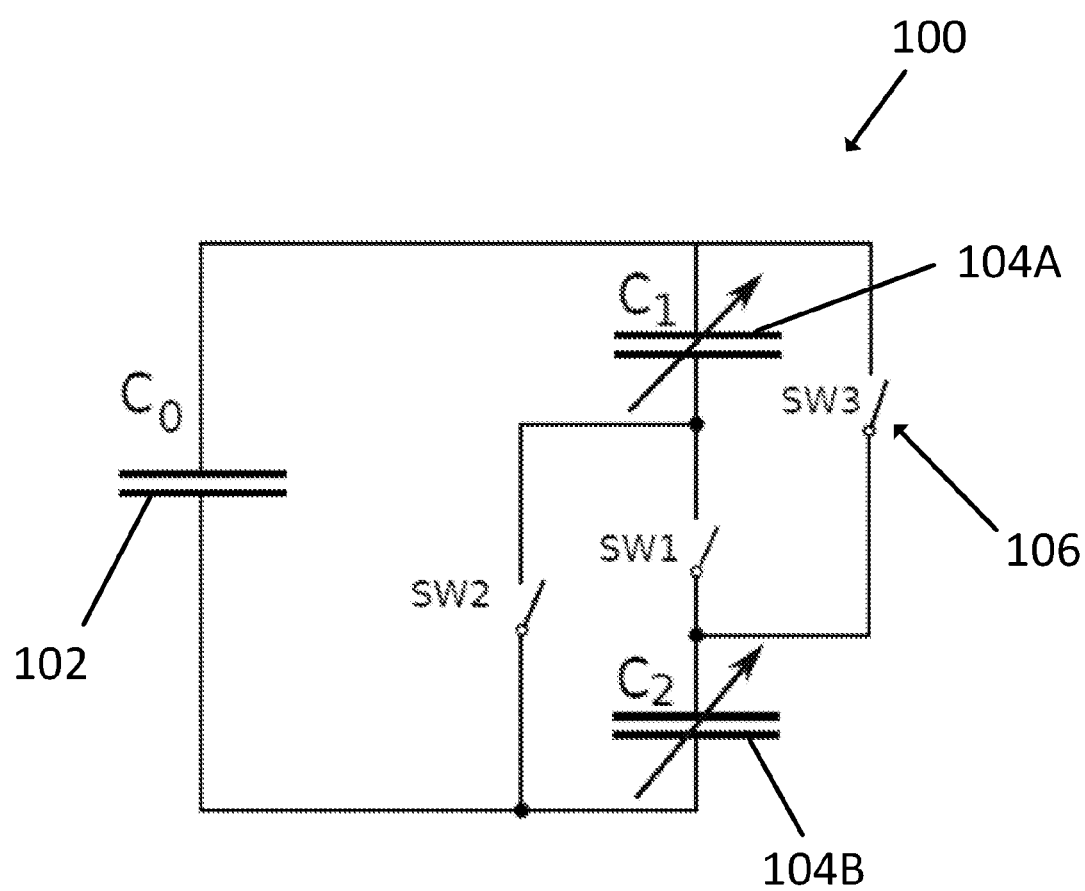
FIG. 1 is a circuit diagram of an ambient energy harvesting system according to certain embodiments including a primary charge storage device and two secondary charge storage devices that are reconfigurable between a series state and parallel state.

The embodiments set forth below represent the necessary information to enable those skilled in the art to practice the embodiments and illustrate the best mode of practicing the embodiments. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

FIG. 1 is a circuit diagram of the ambient energy harvesting system 100 according to one embodiment, including a primary charge storage device 102 (which may also be referred to as a source), two (e.g., first and second) secondary charge storage devices 104A, 104B (which may also be referred to as sinks), and switching circuitry 106. The secondary charge storage devices 104A, 104B are reconfigurable between a series state and parallel state. In the illustrated embodiment, the primary charge storage device 102 comprises a non-variable capacitor, the first secondary charge storage device 104A comprises a variable capacitor, and a second secondary charge storage device 104B comprises a variable capacitor. The switching circuitry 106 includes a first switch SW1, a second switch SW2, and a third switch SW3. The switching circuitry 106 is configured to cyclically alter connection of the first and second secondary charge storage devices 104A, 104B (referred to generally as secondary charge storage devices 104) between a series state and a parallel state. In particular, when the first switch SW1 is closed (and the second and third switches SW2, SW3 are open), the first and second secondary charge storage devices 104A, 104B are connected in series. When the second and third switches SW2, SW3 are closed (and the first switch SW1 is open), the first and second secondary charge storage devices 104A, 104B are connected in parallel. In certain embodiments, transition between the series state and the parallel state of the switching circuitry 106 is responsive to an electrical signal. In other embodiments, transition between the series state and the parallel state of the switching circuitry 106 is responsive to a non-electrical input (e.g., movement of one or more derived from the ambient energy).

As explained in more detail below, capacitances of the first and second secondary charge storage devices 104A, 104B may vary in response to ambient energy. Although the first and second secondary charge storage devices 104A, 104B are embodied as variable capacitors, it is noted that in other embodiments, at least one of the primary storage device 102, the first secondary charge storage device 104A, or the second secondary charge storage device 104B includes a capacitor and/or a capacitance that varies (e.g., embodied in a variable capacitor) in response to receipt of ambient energy. For example, in certain embodiments, only the primary charge storage device 102 includes a capacitance that varies in response to receipt of ambient energy. In other embodiments, only the first secondary charge storage device 104A or the second secondary charge storage device 104B includes a variable capacitance. In yet other embodiments, each of the of the primary storage device 102, the first secondary charge storage device 104A, and the second secondary charge storage device 104B include a capacitance that varies in response to receipt of ambient energy.

The ambient energy harvesting system 100 is configured to accumulate, in the primary charge storage device 102, charge accumulated from the first and second secondary charge storage devices 104A, 104B when connected in the parallel state. The ambient energy harvesting system 100 is also configured to accumulate, in the first and second secondary charge storage devices 104A, 104B when connected in the series state, charge accumulated from the primary charge storage device 102.

The ambient energy harvesting system 100 may be repetitively reconfigured to provide a positive feedback for exponential energy extraction. In particular, the ambient energy is harvested through positive work done on the system 100 and then stored in the system 100 as potential energy. When used in an electric generator, the system 100 produces direct current (DC). Such features of DC operation and direct energy storage have not been possible in other relevant techniques. Utilizing apparatuses and methods disclosed herein, energy may be directly harvested in the form of potential energy, if desired, and then efficiently transferred to external devices.

The ambient energy harvesting system 100 is not limited to specific types of ambient energy (may also be referred to as input energy) that can be harvested, nor does it require the harvested energy (may also be referred to as output energy) to be stored in specific elements within the system 100. In certain embodiments, the ambient energy harvesting system 100 may be configured to harvest ambient energy comprising mechanical vibrations, acoustic vibrations, thermal energy, and/or electrochemical energy, etc. The ambient energy (e.g., thermal, mechanical, etc.) is coupled into the system parametrically. In other words, it does not change the through variables of the elements, but it modifies the characteristic coefficients of the elements and thus their energy levels, as explained in more detail below.

To harvest energy, the system 100 is continuously switched between two configurations, the series state (which may also be referred to as the duplicative state) and the parallel state (which may also be referred to as the distributive state). In both configurations, ambient energy is allowed to enter the system 100 and modify the element energy levels by changing the characteristic coefficients, where $p_i^{(m)}$, i=1, 2 . . . n denotes the coefficients in the duplicative state and $p'_i^{(m)}$, i=1, 2 . . . n denotes the coefficients in the distributive state. In the duplicative state, the sinks 104A, 104B are connected such that the total effect of the cross variables of the sinks 104A, 104B interacting with that of the source 102 is the summation of all cross variables of the sinks 104A, 104B. Based on the principle of minimal potential energy, this allows for transferring part of the through variable of the source 102 to the sinks 104A, 104B. When equilibrium is reached, the energy of the source 102 is duplicated to all sinks 104A, 104B according to efficiencies $\eta_i<1$, i=1, 2 . . . n, which are determined by the parameters $p_i^{(m)}$. The system connectivity in the distributive state is such that at equilibrium, the cross variable of every sink 104A, 104B is the same as that of the source 102. Depending on the element parameters, i.e. $p'_i^{(m)}$, part of the through variables of the sinks 104A, 104B flows to the source 102 according to efficiencies $\eta'_i<1$. By continuously switching the system between the two states while allowing the ambient energy to modify the coefficients of the elements, a positive feedback can be established, leading to exponentially growing energy in the source 102 and the whole system. The method can be used in a variety of applications, including self-powered sensors and biomedical implants, power modules of portable electronic devices, wearable electronics, etc.

An advantage of the system 100 is that the harvested energy grows exponentially. Thus, in contrast to other techniques, the efficiency of the system 100 is not constant during the course of operation, but increases as more energy is harvested. This allows the scavenging of low-level, otherwise wasted energy in the ambient environment (e.g., human motions, structural vibrations, noises, etc.), and accumulating such energy to a useful level (e.g., to power electronic devices of various types). Because of the exponential growing efficiency, it is possible to scale up the system 100 for applications with greater energy demands. For example, if used with high energy density supercapacitors, the system 100 has the potential of generating sufficient energy from ambient environment for normal operation of portable electronic devices (e.g., including phones, biomedical implants, etc.). Such applications have not been achieved with conventional techniques. The system 100 also does not require an external voltage bias, and energy does not need to be removed from the system, but instead it is repetitively used to establish a positive feedback to generate more energy. Further, the system 100 is not tied to a specific transduction mechanism, and thus it allows for more flexible and efficient system designs, and may be used in a broader spectrum of applications.

Figure 2A:
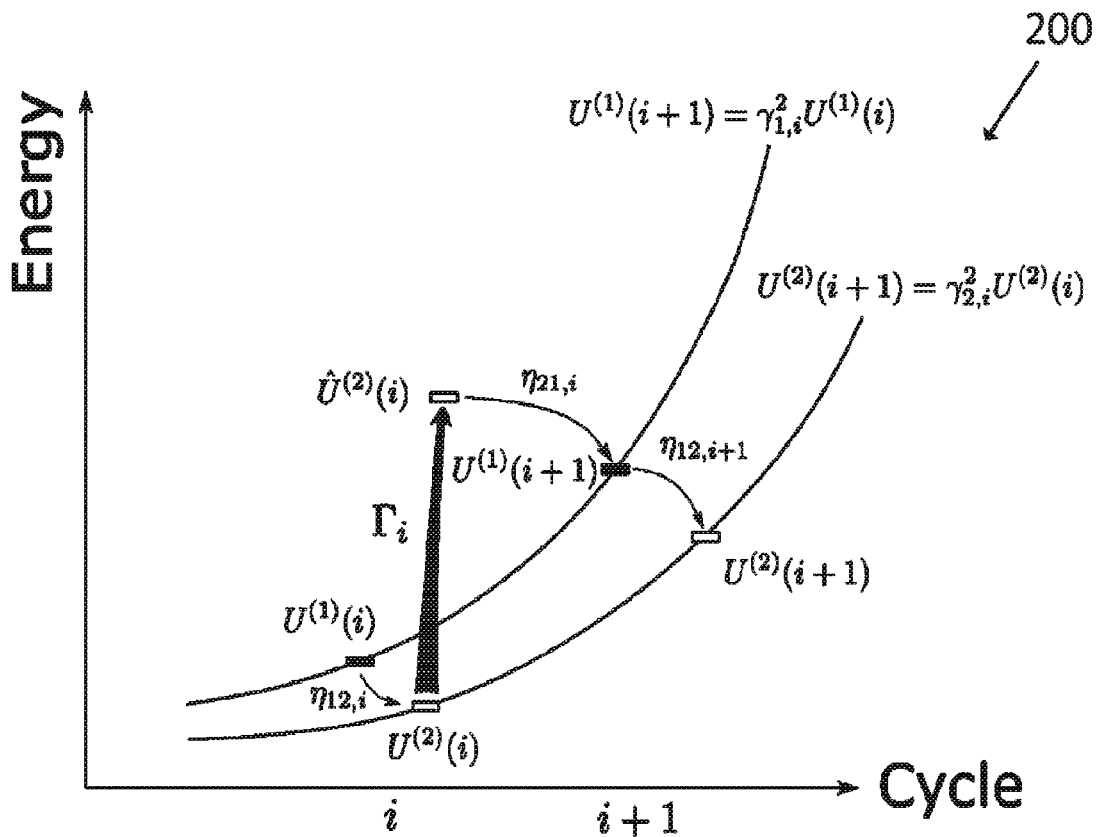
FIG. 2A is a plot of energy versus cycles, illustrating exponential energy growth based on the ambient energy harvesting system of FIG. 1.
Figures 2B, 2C:
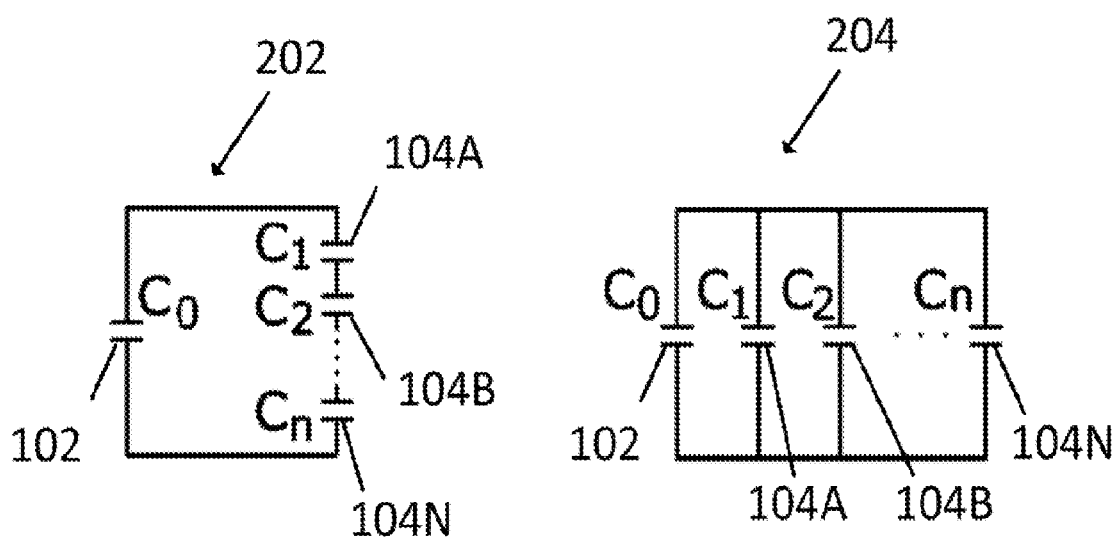
FIG. 2B is a circuit diagram illustrating a first configuration of the secondary charge storage devices of FIG. 2A in a series state.
FIG. 2C is a circuit diagram illustrating a second configuration of the secondary charge storage devices of FIG. 2A in a parallel state.

FIG. 2A is a plot 200 of energy versus cycles illustrating exponential energy growth based on the ambient energy harvesting system 100 of FIG. 1. Such exponential growth of energy occurs when the ambient energy harvesting system 100 is repetitively switched between two configurations (which may also be referred to as operating states). FIG. 2B is a circuit diagram illustrating a first configuration (which may also be referred to as a first operating state) of the secondary capacitors 104 of FIG. 2A in a series state 202. In particular, in FIG. 2B, n secondary capacitors 104 (which may also be referred to as sinks) are connected in series and then in parallel to primary capacitor 102 $C_0$ (which may also be referred to as the source capacitor). FIG. 2C is a circuit diagram illustrating a second configuration (which may also be referred to as a second state) of the secondary charge storage devices 104 (embodied as capacitors) of FIG. 2A in a parallel state 204. In particular, in FIG. 2C, all capacitors 102, 104 are connected in parallel. For the $i^{th}$ cycle, $U^{(1)}(i)$, $U^{(2)}(i)$ denote the system energy for the first configuration (series state 202) and the second configuration (parallel state 204), respectively. $\hat{U}^{(2)}(i)$ denotes the system energy in the parallel state 204 after external work is done. The coefficient for energy loss due to reconfiguration from configuration k (e.g., series state 202) to configuration l (e.g., parallel state 204) in the $j^{th}$ cycle without positive energy input is denoted by $\eta_{kl,j}$ (k, l=1, 2 and k≠l). The gain of the system energy due to external work is represented by $\Gamma_i$.

Referring back to FIG. 2A, the ambient energy harvesting system 100 is repetitively switched between two configurations, and positive external work is performed only in one of the configurations (although in some embodiments, positive external work may be performed in both configurations). Without loss of generality, assume that an energy harvesting cycle starts from the equilibrium state of the first configuration, energy is harvested in the second configuration, and the cycle completes when the system 100 is switched from the second configuration 204 back to the equilibrium state of the first configuration 202.

The system energy (i.e. the harvested energy) evolves as $U^{(w)}(i+1)=\gamma_{w,i}^2 U^{(w)}(i)$, where w=1, 2 indicating the configurations, $\gamma_{1,i}=\sqrt{\Gamma_i \eta_{12,i} \eta_{21,i}}$, and $\gamma_{2,i}=\sqrt{\Gamma_i \eta_{21,i} \eta_{12,i+1}}$. Without positive external work, a system cannot move to an equilibrium state of a higher energy level, thus $\eta_{12,i}$, $\eta_{12,i+1}$, $\eta_{21,i} \leq 1$, representing the energy loss during reconfiguration. If the positive external work is sufficient to compensate the loss, i.e. $\Gamma_i>\max\{(1/\eta_{12,i} \cdot 1/\eta_{21,i}),(1/\eta_{12,i+1} \cdot 1/\eta_{21,i})\}$, and thus, $\gamma_{1,i},\gamma_{2,i}>1$, the system energy will grow exponentially.

Without loss of generality, assume a cycle starts from the equilibrium state when the system is in the first configuration 202. For the $i^{th}$ cycle, the charge is distributed such that $q_k^{(1)}=\bar{q}^{(1)}(i)$, k=1, 2 . . . n and $q_0^{(1)}(i)=C_0/C_{sr}^{(1)} T \bar{q}^{(1)}(i)$, $C_{sr}^{(1)}=1/(\Sigma_{k=1}^n 1/C_k)$, where the superscripts indicate the configurations. The total electrical potential energy of the system is $$U^{(1)}(i) = \frac{1}{2} \frac{Q^2(i)}{C_0} \frac{s(s+1)}{(s+n)^2} \quad (1)$$

where $Q(i)=Q_0^{(1)}(i)+n\bar{q}^{(1)}(i)$ and $s=C_0/C_{sr}^{(1)}$. After the system 100 is switched to the second configuration 204 and equilibrium is reached, the charge distribution is $$q_k^{(2)}(i)=\bar{\eta}_k^{(2)} Q(i) \ k=0,1,2 \ldots n \quad (2)$$

where $\bar{\eta}_k^{(2)}=C_k/C_{eqv}^{(2)}$ and $C_{eqv}^{(2)}=\Sigma_{l=0}^n C_l$. The system energy is $$U^{(2)}(i) = \frac{Q^2(i)}{2C_{eqv}^{(2)}} \quad (3)$$

If the external energy is coupled into the system parametrically, i.e. the capacitances are changed from $C_k$ to $C'_k$, which leads to an increase in the system energy, the total system energy becomes $$\hat{U}^{(2)}(i) = \frac{1}{2} \frac{Q^2(i)}{C'_{eqv}} \quad (4)$$

where $C'_{eqv} = \Sigma_{l=0}^{n} C'_l$. The charge is redistributed as $$\hat{q}_k^{(2)}(i) = \hat{\eta}_k^{(2)} Q(i) \quad (5)$$

where $\hat{\eta}_k^{(2)} = C'_k / C'_{eqv}$.

The system 100 is then switched back to the first configuration 202 and the capacitances revert to the original values. The total charge after equilibrium is reached is the total charge for the start of the $(i+1)^{th}$ cycle (or the $j^{th}$ cycle) and the charge is distributed as $$q_0^{(1)}(i+1) = \hat{q}_0^{(2)}(i) - \Delta Q(i) \quad (6)$$
$$q_k^{(1)}(i+1) = \hat{q}_k^{(2)}(i) - \Delta Q(i)$$
$$k = 1, 2 \ldots n$$

where $$\Delta Q(i) = \frac{C_0 \left(r_0 - \sum_{k=1}^{n} r_k\right)}{C'_{eqv}(1+s)} Q(i) \quad (7)$$

where $r_l = C'_l / C_l$, $l = 0, 1, 2 \ldots n$. Therefore, $$Q(i+1) = Q(i) + (n-1)\Delta Q(i) = \gamma Q(i) \quad (8)$$

$$\gamma = 1 + (n-1)\frac{C_0 \left(r_0 - \sum_{k=1}^{n} r_k\right)}{C'_{eqv}(1+s)}$$

FIG. 2A relates to an example of a two-configuration system of n+1 capacitors. When the system 100 is switched repetitively between the two configurations 202, 204 and positive external work is performed in the second configuration 204 by changing the capacitances from $C_k$ to $C'_k$ (k=0, 1, 2 ... n) without changing the charge carried by individual capacitors, the total summation of the charge in the system follows $Q(i+1) = \gamma Q(i)$, where:

$$\gamma = 1 + (n-1)\frac{C_0 \left(r_0 - \sum_{k=1}^{n} r_k\right)}{C'_{eqv} \cdot (1+s)} \quad (9)$$

where $r_l = C'_l / C_l$, $l = 0, 1, 2 \ldots n$, $C'_{eqv} = \Sigma_{k=0}^{n} C'_k$ and $s = C_0 / C_{sr}$, in which $C_{sr} = 1/(\Sigma_{k=1}^{n} 1/C_k)$. When n>1 and $r_0 > \Sigma_{k=1}^{n} r_k$, and thus, $\gamma > 1$, the total amount of charge grows exponentially. The corresponding electrostatic energy stored in the system grows exponentially with a base of $\gamma^2$. When $C_1 = C_2 = \ldots C_n = C$ and $C_1' = C_2' = \ldots C_n' = C'$, it follows that $$\gamma = 1 + (n-1)\frac{\alpha\beta - n}{(\alpha + n)(\beta + n)} < n \quad (\alpha = C'_0 / C', \beta = C / C_0) \quad (10)$$

Therefore, any arbitrarily small amount of initial charge in the system, which is inevitable in reality, will start an exponential growth of charge. A generalized result can be obtained for any reconfigurable system, composed of one-port, two-terminal energy storage elements with generalized across and through variables. The across variable of an element is a monotonic, single-valued function of the generalized through variable, which describes the constitutive law of the element.

The series configuration 202 may be referred to as the duplicative configuration (or duplicative state), in which for the system to reach equilibrium from a non-equilibrium state, the change of the through variable of every sink is the negation of that of the source element. The parallel configuration 204 may be referred to as the distributive configuration (or distributive state), in which the total amount of through variables in the system is conserved when the system is in the process of reaching equilibrium. According to the principle of minimum potential energy, in the duplicative state, the summation of the across variables of the sinks at equilibrium is equivalent to the across variable of the source element 102, whereas in the distributive state 202, the across variable of every sink 104 at equilibrium is that of the source element 102. Assume that the system 100 is repetitively switched between the two configurations 202, 204. Denote the total amount of the through variables as $Q^{(1)}(i)$ and $Q^{(2)}(i)$ for the duplicative state 202 and the distributive state 204 in the $i^{th}$ cycle, respectively; $\Delta Q^{(12)}(i) = \zeta^{(12)}(i)Q^{(1)}(i)$, $\Delta Q^{(21)}(i) = \zeta^{(21)}(i)Q^{(2)}(i)$ represent the changes of the total amount of through variables corresponding to the transition from the duplicative state 202 to the distributive state 204 and vice versa.

Without loss of generality, assume that the $i^{th}$ cycle starts from the duplicative state 202 after equilibrium is reached. For the $k^{th}$ element, the energy and the through variable are denoted as $U_k^{(1)}(i)$ and $q_k^{(1)}(i)$, respectively. The total system energy and the summation of all through variables are denoted as $U^{(1)}(i) = \Sigma_{l=0}^{n} U_l^{(1)}(i)$ and $Q^{(1)}(i) = \Sigma_{l=0}^{n} q_l^{(1)}(i)$, respectively. The cycle completes when equilibrium is established after the system is switched to the distributive state 204. The energy and the through variable of the $k^{th}$ element for the distributive state 204 are denoted as $U_k^{(2)}(i)$ and $q_k^{(2)}(i)$, respectively. The change of the total through variables in the transition from the duplicative state 202 to the distributive state 204 is denoted by $\Delta Q^{(12)}(i) = \zeta^{(12)}(i)Q^{(1)}(i)$. The through variables can be determined using the Lagrangian defined as $$\mathcal{L}(i) = U^{(2)}(i) + \lambda(i)\left(\sum_{k=0}^{k} q_k^{(2)}(i) - Q^{(2)}(i)\right) \quad (11)$$

where $\lambda(i)$ is the Lagrange multiplier, $U^{(2)}(i) = \Sigma_{l=0}^{n} U_l^{(2)}(i)$, and $Q^{(2)}(i) = \Sigma_{k=0}^{n} q_k^{(2)}(i)$. According to the principle of minimum potential energy, $$\frac{\partial \mathcal{L}(i)}{\partial q_k^{(2)}(i)} = \frac{\partial U^{(2)}(i)}{\partial q_k^{(2)}(i)} + \lambda(i) = 0, \quad (12)$$

$$k = 0, 1, 2 \ldots n$$

$$\frac{\partial \mathcal{L}(i)}{\partial \lambda(i)} = \sum_{l=0}^{n} q_l^{(2)}(i) - Q^{(2)}(i) = 0$$

The through variable of each element can be obtained as $$q_k^{(2)}(i) = \eta_k(i)Q^{(2)}(i), \tag{13}$$

$$\sum_{k=0}^{n} \eta_k(i) = 1$$

When the system 100 is subsequently switched to the duplicative state 202, which is the start of the i+1$^{th}$ cycle (or the j$^{th}$ cycle), based on the characteristics of the duplicative state, a new Lagrangian is defined as $$\mathcal{L}(i+1) = U^{(1)}(i+1) + \sum_{l=1}^{n} \lambda_l(i+1)(q_l^{(1)}(i+1) - q_l^{(2)}(i) - \Delta Q^{(21)}(i)) + \tag{14}$$
$$\lambda_0(i+1)(q_0^{(1)}(i+1) - q_0^{(2)}(i) + \Delta Q^{(21)}(i))$$

where $\Delta Q^{(21)}(i) = \zeta^{(21)}(i)Q^{(2)}(i)$ denotes the change of the total through variables required for equilibrium. The principle of minimum potential energy requires:

$$\frac{\partial \mathcal{L}(i+1)}{\partial q_k^{(1)}(i+1)} = \frac{\partial U_k^{(1)}(i+1)}{\partial q_k^{(2)}(i)} + \lambda_k(i+1) = 0 \tag{15}$$

$$\frac{\partial \mathcal{L}(i+1)}{\partial \lambda_k(i+1)} = q_k^{(1)}(i+1) - q_k^{(2)}(i) - \Delta Q^{(21)}(i) = 0$$

$$\frac{\partial \mathcal{L}(i+1)}{\partial \lambda_0(i+1)} = q_0^{(1)}(i+1) - q_0^{(2)}(i) + \Delta Q^{(21)}(i) = 0$$

$$\frac{\partial \mathcal{L}(i+1)}{\partial \Delta Q(i)} = -\sum_{l=1}^{n} \lambda_l(i+1) + \lambda_0(i+1) = 0$$

$$k = 1, 2 \ldots n$$

The total through variables in the i+1$^{th}$ cycle are obtained as $$Q^{(1)}(i+1) = \gamma_1(i)Q^{(1)}(i), \gamma_1(i) = [1 + \zeta^{(12)}(i)][1 + (n-1)\zeta^{(21)}(i)]$$

$$Q^{(2)}(i+1) = \gamma_2(i)Q^{(1)}(i), \gamma_2(i) = [1 + \zeta^{(12)}(i)][1 + (n-1)\zeta^{(21)}(i+1)] \tag{16}$$

When n≥1 and $\zeta^{(12)}(i), \zeta^{(21)}(i) > 0$ for all cycles, $\gamma_w(i) > 1$, leading to the exponential growth of not only the through variables, but ultimately the across variables and the harvested energy. Note that the same result applies for systems in which the roles of the across and the through variables are switched.

Figure 3A:
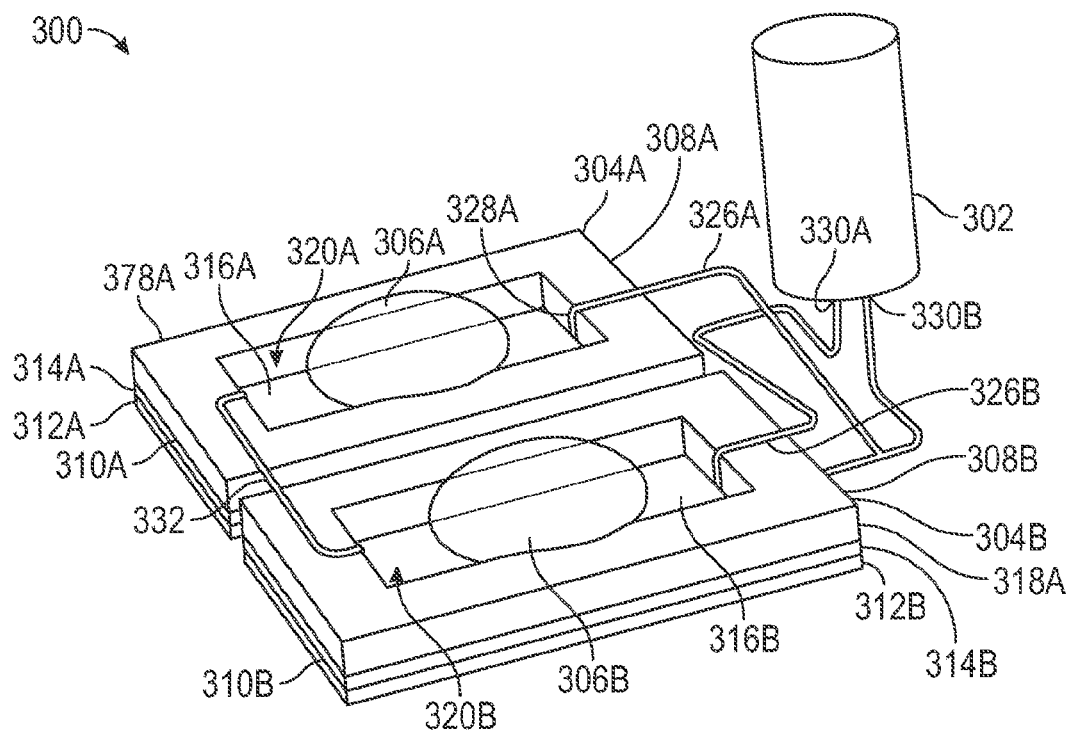
FIG. 3A is a perspective view illustration of an ambient energy harvesting apparatus using two moveable droplet-based variable capacitor elements according to certain embodiments.
Figure 3B:
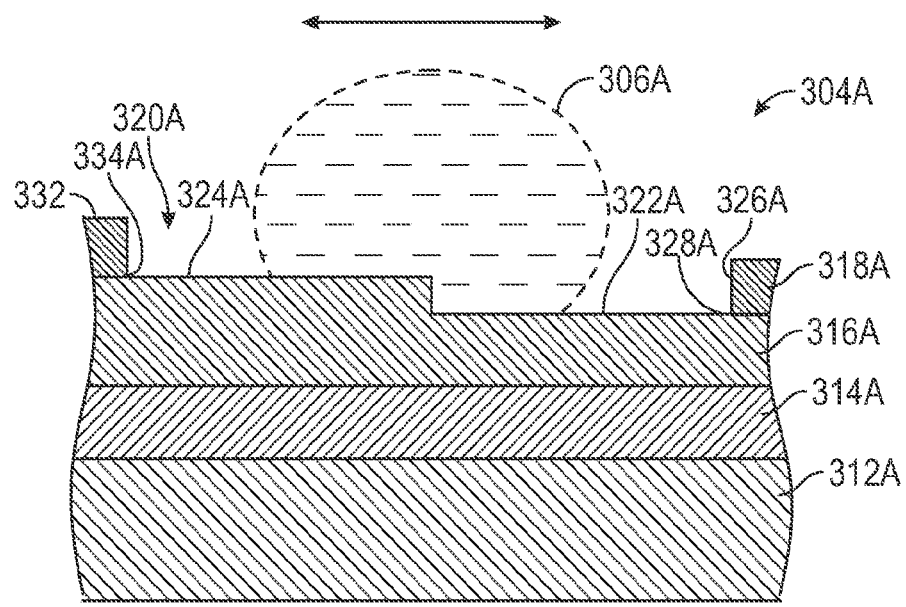
FIG. 3B is a side cross-sectional view of one of the moveable droplet-based variable capacitors of the ambient energy harvesting apparatus of FIG. 3A.

FIGS. 3A-3B illustrate an ambient energy harvesting apparatus 300 using two moveable liquid droplets. Referring to FIG. 3A, the primary charge storage device 102 (of FIG. 1) is embodied as a source capacitor 302 and two secondary charge storage devices 104A, 104B (of FIG. 1) are embodied as a first droplet variable capacitor 304A and a second droplet variable capacitor 304B, respectively. In certain embodiments, the source capacitor 302 (may also be referred to as a source element) is commercial ceramic capacitor, $C_0$. The switching circuitry 106 are first and second electrically conductive liquid droplets 306A, 306B (which may also be referred to as first and second electrically conductive elements) that move in response to receipt of ambient energy. In certain embodiments, the electrically conductive liquid droplets 306A, 306B (generally referred to as liquid droplets 306) may comprise water or mercury.

Referring to FIG. 3B, the first droplet variable capacitor 304A is shown and described, but the description also applies to the second droplet variable capacitor 304B. The first droplet variable capacitor 304A of the ambient energy harvesting apparatus 300 includes a first side 308A and a second side 310A opposite the first side 308A. The first droplet variable capacitor 304A includes a back electrode 312A, a dielectric layer 314A positioned above the back electrode 312A, and a non-polar dielectric coating 316A positioned over the dielectric layer 314A. The dielectric surface (e.g., non-polar dielectric coating 316A) may or may not include an initial charge, but the operation of the apparatus would remain the same. The ambient energy harvesting apparatus 300 further includes a free-standing conductive liquid drop 306A as the other electrode. The back electrode 312A, the dielectric materials (dielectric layer 314A and non-polar dielectric coating 316A), and conductive liquid drop 306A form a capacitor.

The ambient energy harvesting apparatus 300 further includes a peripheral layer 318A positioned above the non-polar dielectric coating 316A and defining a channel 320A therein. The conductive liquid drop 306A is positioned within the channel 320A and is moveable therein. In certain embodiments, the first droplet variable capacitor 304A may further include an enclosure layer (not shown) positioned over the periphery layer 318A and the channel 320A, thereby enclosing the first droplet variable capacitor 304A within the channel 320A.

The non-polar dielectric coating 316A forms a hydrophobic surface. The non-polar dielectric coating 316A includes an increased capacitance region 322A (with a decreased thickness) towards the first side 308A and a decreased capacitance region 324A (with an increased thickness) towards the second side 310A. The two capacitance regions 332A, 324A have equal area but different thicknesses. Because of the variation in thickness, the capacitance changes depending on whether the conductive liquid drop 306A is positioned towards the first side 308A (above the increased capacitance region 322A) or towards the second side 310A (above the decreased capacitance region 324A). In other words, the capacitance associated with the thinner side, C, is larger than that associated with the thicker side, C'.

A first series metal contact 326A electrically connects the first droplet variable capacitor 304A with the source capacitor 302. In particular, a first end 328A of the first series metal contact 326A is positioned within the channel 320A proximate the first side 308A of the first droplet variable connector 304A, and a second end 330A of the first metal contact 326A is electrically connected to the source capacitor 302. Similarly, a second series metal contact 326B electrically connects the second droplet variable capacitor 304B with the source capacitor 302. A first end 328B of the second series metal contact 326B is positioned within the channel 320B proximate to the first side 308B of the second droplet variable connector 304B, and the second end 330B of the second metal contact 326B is electrically connected to the source capacitor 302.

A parallel metal contact 332 electrically connects the first and second droplet variable capacitors 304A, 304B to each other. In particular, a first end 334A of the parallel metal contact 332 is positioned within the channel 320A proximate the second side 310A of the first droplet variable capacitor 304A, and the second end 334B (not shown) of the parallel metal contact 332 is positioned within the channel 320B proximate to the second side 310B of the second droplet variable capacitor 304B. In this way, for example, the conductive liquid drop 306A may make electrical contact with either the parallel metal contact 332 or the first series metal contact 326A, but not both contacts 332, 326A at the same time.

When the first conductive liquid drop 306A is between the parallel metal contact 332 and the first series metal contact 326A, and the second conductive liquid drop 306B is between the parallel metal contact 332 and the first series metal contact 326B (i.e., with neither drop 306A, 306B touching a metal contact), then all the switches are open. When the first conductive liquid drop 306A touches the first series metal contact 326A, and the second conductive liquid drop 306B touches the second series metal contact 326B, then the first and second droplet variable capacitors 304A, 304B are connected in series (SW1 is closed and SW2 and SW3 are open) and are in the duplicative state. When the first conductive liquid drop 306A touches the first end 334A of the parallel metal contact 332, and the second conductive liquid drop 306B touches the second end 334B of the parallel metal contact 332, then the first and second droplet variable capacitors 304A, 304B are connected in parallel (SW1 is open and SW2 and SW3 are closed) and are in the distributive state. These features ensure that the system is repetitively switched between the two states when the drops 306A, 306B oscillate between the two regions (e.g., regions 322A, 324A). Therefore, if the capacitance variation satisfies $\alpha\beta=C/C'>2$, the total summation of the charge in the capacitors will grow exponentially.

If a liquid drop 306A, 306B is brought into contact with an initially uncharged surface and then separated for the first time, the surface will be electrified due to contact electrification. Subsequent oscillatory motions of the drop on the surface will cause the surface charge to increase to a saturated value, which will be different for the two sides because of the molecular-scale fluctuations of surface properties. The two sides will behave as electrets afterwards. Electrostatic induction will then become the dominating mechanism that determines the charge distribution on the liquid drop 306A, 306B. The effect of electrostatic induction can be modeled by a fixed amount of charge, $Q_c$, which is transferred to or removed from the drop when it moves from one side to the other.

The contacts between a charged liquid drop 306A, 306B and the surface (e.g., non-polar coating 316A) will also induce charge trapping at the surface, which limits the amount of charge that can move with the drop. However, the fact that the trapped charge can be annihilated by grounding the drop suggests that trapping occurs on the surface rather than in the insulator. Because of the internal connectivity of the system, the drop 306A, 306B is charged when it is on the thinner side (i.e., increased capacitance region 322A) and almost completely discharged when moving to the thicker side (i.e., decreased capacitance region 324A). Therefore, charge trapping is negligible for the thicker side (decreased capacitance region 324A). The trapping on the thinner side (increased capacitance region 322A) can be accurately modeled with a parasite capacitor $C_p$, connected in parallel to the effective capacitor ($\tilde{C}$) associated with the thinner side. The total capacitance of an individual capacitor in the duplicative state is then $C=\tilde{C}+C_p$. Because of the two effects, the summation of the charge of all capacitors in the $i^{th}$ cycle for the duplicative, $Q^{(1)}(i)$, and the distributive states, $Q^{(2)}(i)$, are different, which are obtained as follows $$Q^{(w)}(i+1)=\hat{\gamma}Q^{(w)}(i)+\xi^{(w)}Q_c\hat{\gamma}=\gamma-\gamma_p \quad (17)$$

where w=1, 2. The effect of charge trapping on the growth of the total charge is represented by $\gamma_p=(n-1)\delta/[(n+\alpha)(n+\beta)]$, where $\delta=C_p/C'$, and the effect of electrostatic induction is represented by $$\xi^{(1)} = \frac{n(n-1)\alpha}{n+\alpha}\frac{1+\beta}{n+\beta}$$

for the duplicative state and $$\xi^{(2)} = \frac{n(n-1)}{n+\beta}$$

for the distributive state.

FIGS. 4A-4D relate to exemplary ambient energy harvesting apparatuses that include multiple moveable mercury droplet-based variable capacitors, whereas FIGS. 5A-5D relate to exemplary ambient energy harvesting apparatuses that include multiple moveable water droplet-based variable capacitors. In certain embodiments, the capacitors are fabricated on 2-inch doped silicon wafers (with resistivity of 1-10 Ω·cm), one capacitor per wafer. The doped silicon may be used as the back electrode. A layer of 200 nm silicon dioxide may be grown on one side of the wafer. Cytop may be spin-coated on silicon dioxide to create a 200 nm layer. Additional Cytop may be manually applied to the spin-coated layer to achieve a thickness of 3.8 μm-4 μm. As explained in more detail below, for every capacitor in which a water drop of approximately 300 μL was used as the moving electrode, the maximum and the minimum capacitances are about 3.52 nF and 0.45 nF, respectively. The parasite capacitance accounting for charge trapping was approximately 0.76 nF. For capacitors in which a mercury drop of 150 μL was used, the maximum and the minimum capacitances are about 2.74 nF and 0.27 nF, respectively.

Figure 4A:
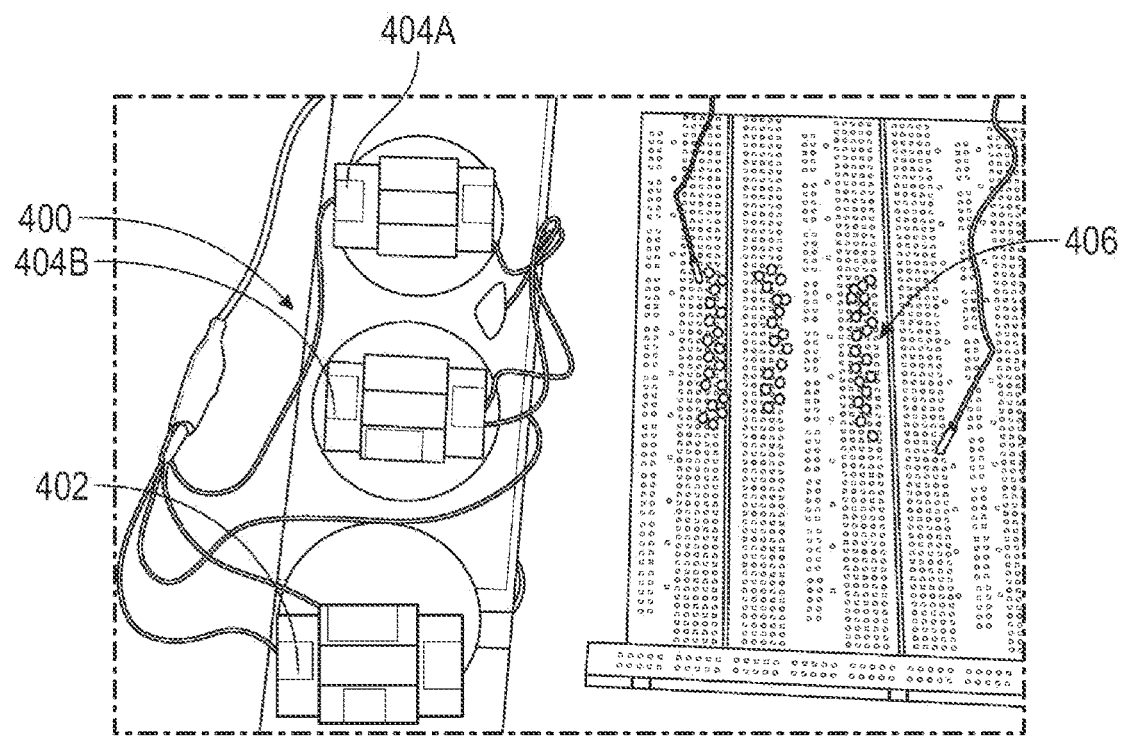
FIG. 4A is an upper perspective view illustration of three ambient energy harvesting apparatuses each including two moveable mercury droplet-based variable capacitors, with the ambient energy harvesting apparatuses being operatively connected to a string of series-arranged light emitting diodes.

FIG. 4A is an upper perspective view of an ambient energy harvesting apparatus 400 including three moveable droplet-based variable capacitors 402-404B using mercury droplets. The harvesting apparatus 400 operates a group of LEDs 406 after a couple of low frequency oscillations. In particular, the three droplet variable capacitors 402-404B include one source 402 and two sinks 404A, 404B. The moveable droplet-based variable capacitors 402-404B were operated at a vibration frequency of 2.5 Hz (similar to vibrations induced by human walking), although of course other vibration frequencies could be used. Mercury drops (300 μL) were used. After a few initial cycles of energy accumulation, the energy extracted per cycle by the apparatus 400 was sufficient to illuminate 60 green LEDs 406. The maximum number of LEDs that were lit depended on the breakdown voltage of the thinner side of the Cytop film. The breakdown voltage was estimated to be around 29 V, corresponding to a peak value of 168 V on the source capacitor 402 in the distributive state.

Figure 4B:
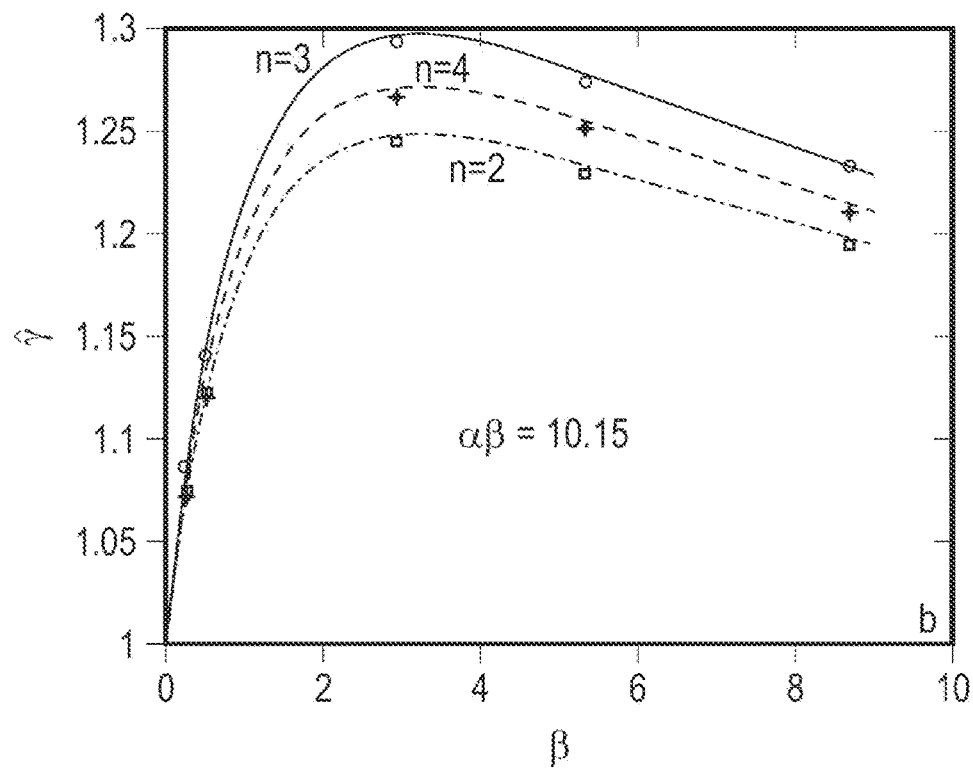
FIG. 4B is a plot of base of exponential growth ($\hat{\gamma}$) versus ratio of capacitances of sink capacitors to the source capacitors for two, three, and four moveable mercury droplet-based variable capacitors.

FIG. 4B is a plot of exponential growth, $\hat{\gamma}$, versus ratio of capacitances of the sink capacitors 404A, 404B to the source capacitors 402 (i.e. $\beta=C/C_0$) for a different number of sink capacitors with the same Cytop coatings, using mercury droplets as the moveable liquid medium. For any system in which identical capacitors of a fixed value of cog are used as the sinks, there exists an optimal number of sinks that will result in the maximum base of exponential growth. The thinner side of every capacitor was 200 nm thick, whereas the thicker sides varied from 3.8 µm to 4 µm. The optimal number of sinks was found theoretically and verified experimentally to be $n_{opt}=3$. However, any number of sinks could be used depending on the specifications of the energy harvesting apparatus 400.

Figure 4C:
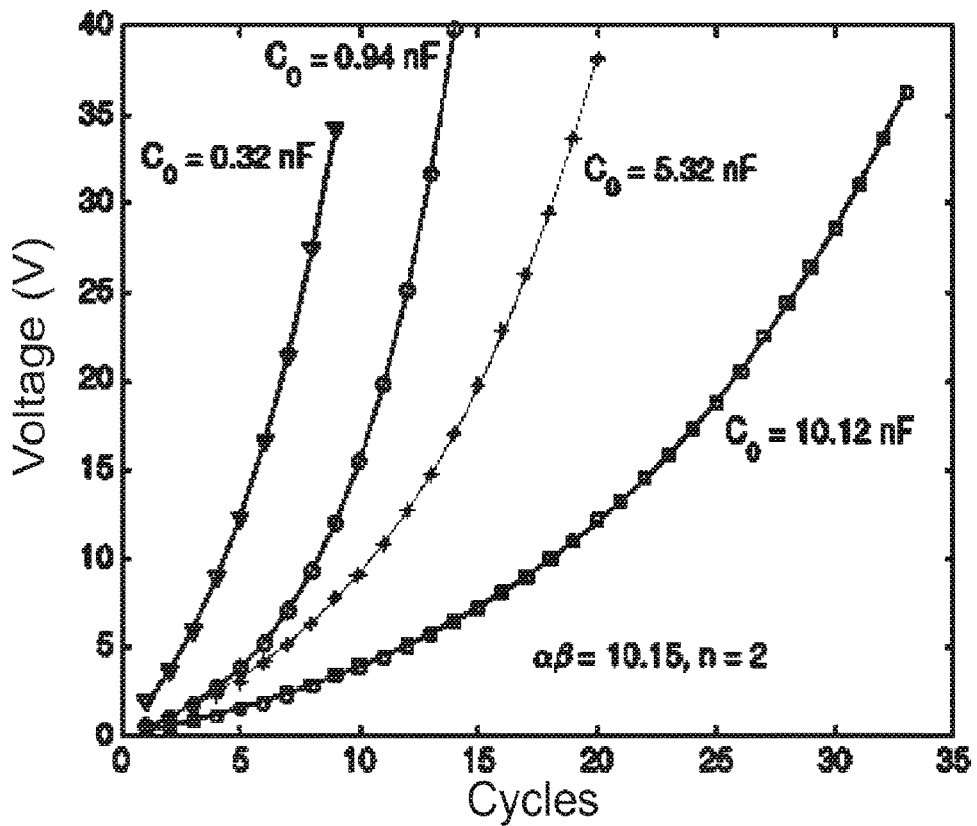
FIG. 4C is plot of voltage versus cycles illustrating energy growth using an ambient energy harvesting apparatus incorporating two moveable mercury droplet-based variable capacitors as sink capacitors.
Figure 4D:
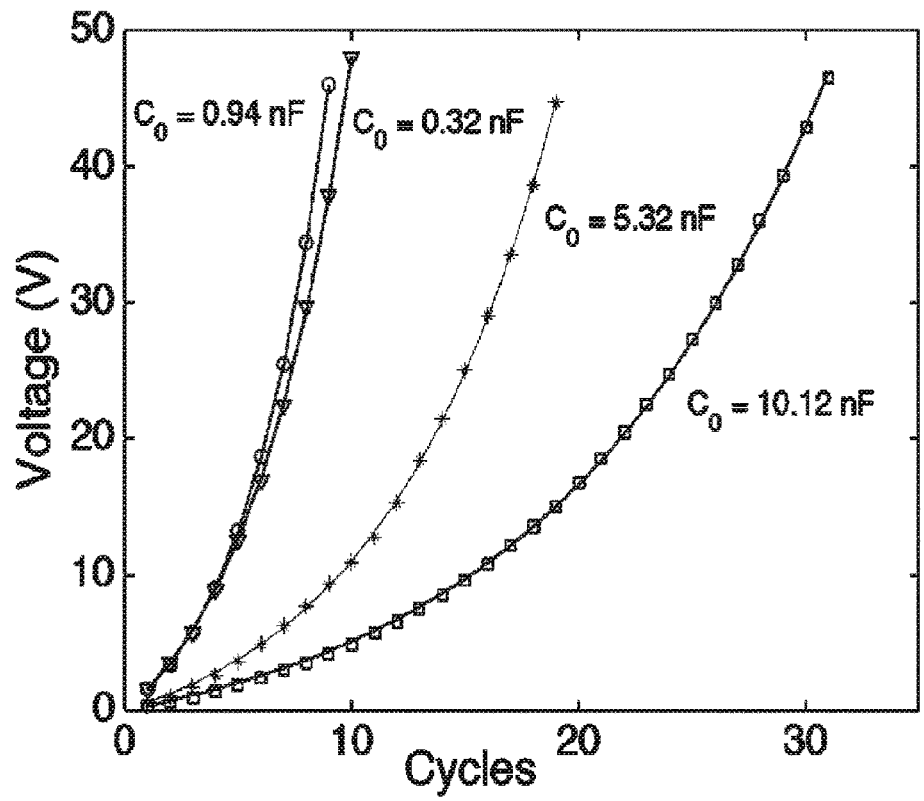
FIG. 4D is a plot of voltage versus cycles illustrating energy growth using an ambient energy harvesting apparatuses incorporating four moveable mercury droplet-based variable capacitors as sink capacitors.

FIG. 4C is a plot of voltage versus cycles illustrating energy growth using an ambient energy harvesting apparatus incorporating two moveable mercury droplet-based variable capacitors as sink capacitors. FIG. 4D is a plot of voltage versus cycles illustrating energy growth using an ambient energy harvesting apparatuses incorporating four moveable mercury droplet-based variable capacitors as sink capacitors. For FIGS. 4C and 4D, the ambient energy harvesting apparatus 400 had a tilting angle of the wafer within ±5°, which indicates that the total input energy, equal to the potential energy of the drops, was 83.2 µJ in a round trip of three mercury drops. Therefore, if immediately before the voltage reaches the breakdown threshold, the exact amount of energy is removed from the source capacitor such that the voltage in the next cycle is just below the breakdown voltage, the generator with three mercury drops can harvest 10.2 µJ per cycle, corresponding to a harvesting efficiency of 12.2%.

Figure 5A:
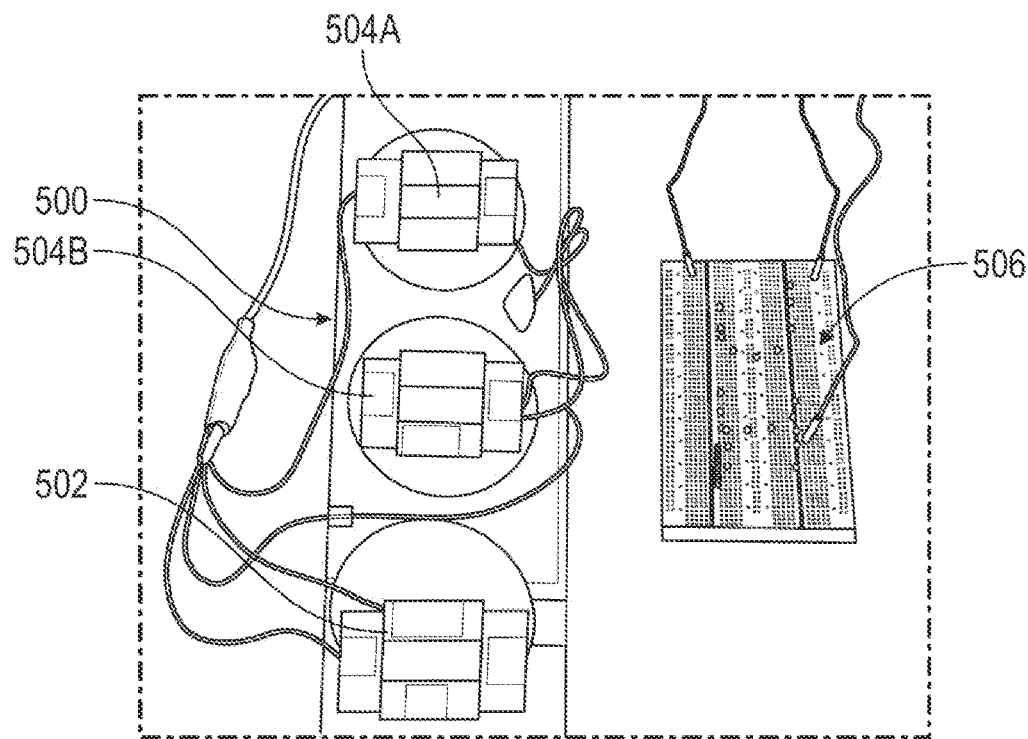
FIG. 5A is an upper perspective view illustration of three ambient energy harvesting apparatuses each including two moveable water droplet-based variable capacitors, with the ambient energy harvesting apparatuses being operatively connected to a string of series-arranged light emitting diodes.

FIG. 5A is an upper perspective view illustration of an ambient energy harvesting system 500 with three ambient energy harvesting apparatuses each including two moveable water droplet-based variable capacitors, 502-504B using water droplets and connected to a string of series-arranged light emitting diodes. The harvesting apparatus 500 is sufficient to operate a group of LEDs 506 after a couple of low frequency oscillations.

The three moveable droplet-based variable capacitors 502-504B include one source capacitor 502 and two sink capacitors 504A, 504B. The moveable droplet-based variable capacitors 502-504B were operated at a vibration frequency of 2.5 Hz (similar to vibrations induced by human walking), although of course other vibration frequencies could be used. After a few initial cycles of energy accumulation, the energy extracted per cycle by the apparatus 500 was sufficient to illuminate 20 green LEDs 506. The maximum number of LEDs that were lit depended on the breakdown voltage of the thinner side of the Cytop film. The breakdown voltage was estimated to be around 29 V, with a peak value of 168 V. Plain water drops (300 µL) were used. It is worth noting that while mercury and water are both liquids at room temperature, the charge carriers are different. The maximum number of LEDs that were lit depended on the breakdown voltage of the thinner side of the Cytop film. The breakdown voltage was conservatively estimated to be around 12 V, corresponding to a peak value of 56 V on the source capacitor 502 in the distributive state.

Figure 5B:
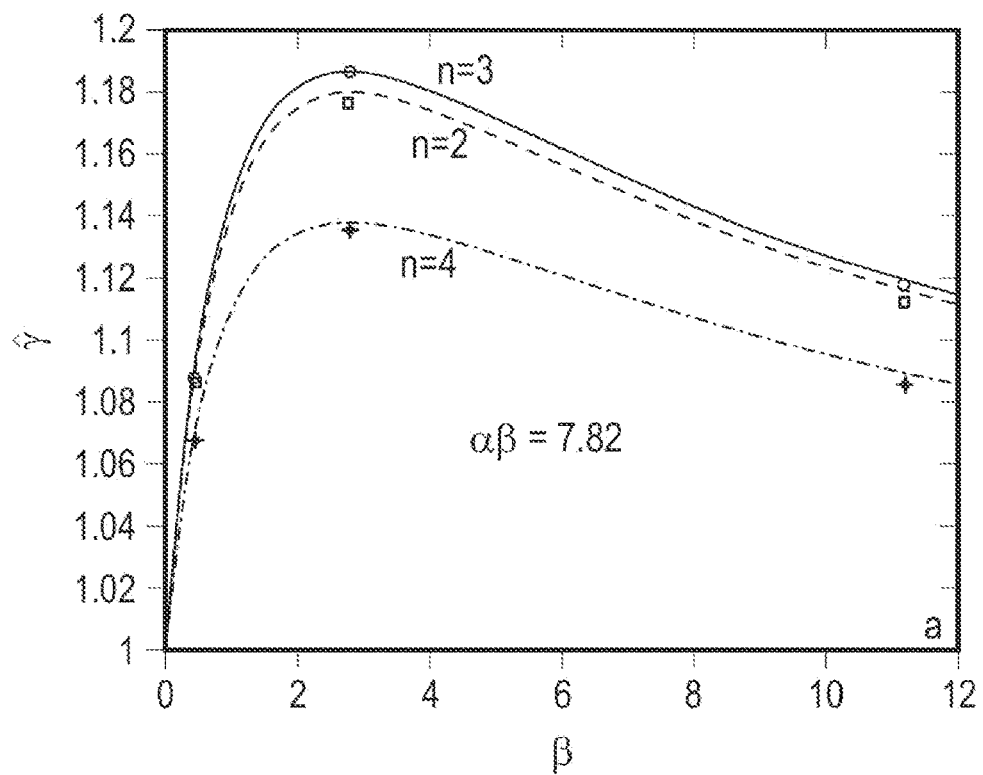
FIG. 5B is a plot of base of exponential growth ($\hat{\gamma}$) versus ratio of capacitances of sink capacitors to the source capacitors for two, three, and four moveable water droplet-based variable capacitors.

FIG. 5B is a plot of base of exponential growth $\hat{\gamma}$, versus ratio of capacitances of sink capacitors to the source capacitors (i.e. $\beta=C/C_0$) for a different number of sink capacitors with the same Cytop coatings using water droplets. As noted above, for any system in which identical capacitors of a fixed value of cog are used as the sinks, there exists an optimal number of sinks that will result in the maximum base of exponential growth. The thinner side of every capacitor had a thickness of 200 nm, whereas the thicker sides varied from 3.8 µm to 4 µm. The optimal number of sinks was found theoretically and verified experimentally to be $n_{opt}=3$.

Figure 5C:
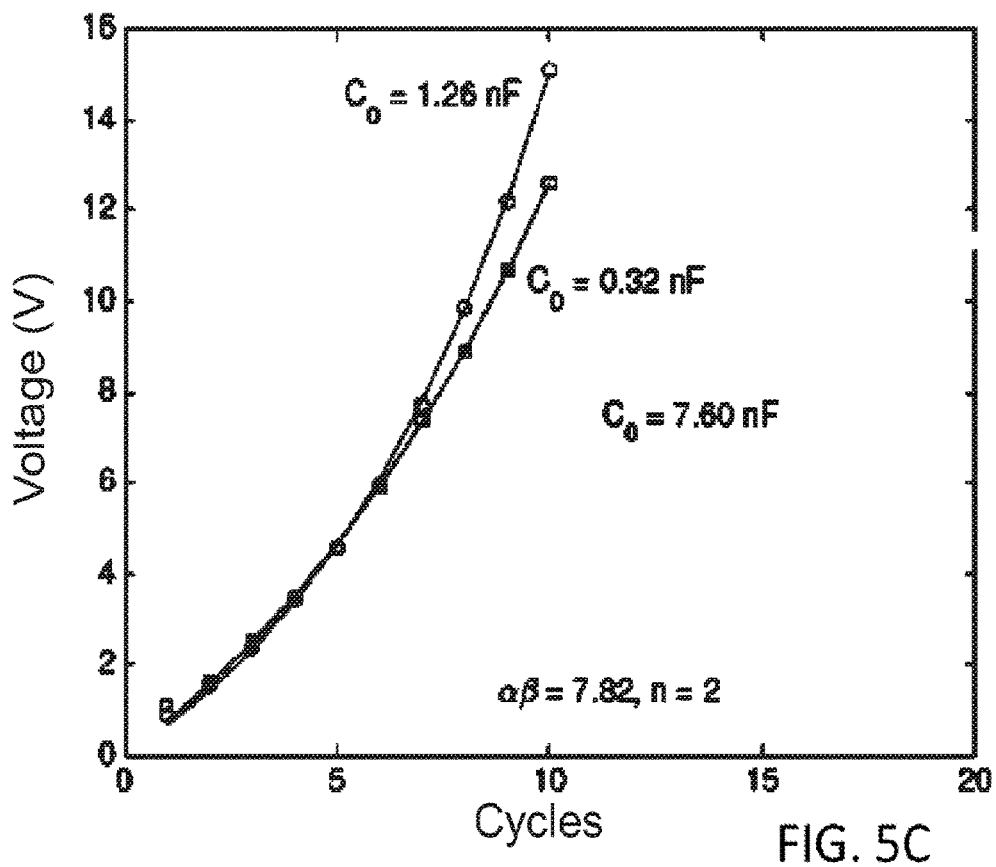
FIG. 5C is a plot of voltage versus cycles illustrating energy growth using an ambient energy harvesting apparatus incorporating two moveable water droplet-based variable capacitors as sink capacitors.
Figure 5D:
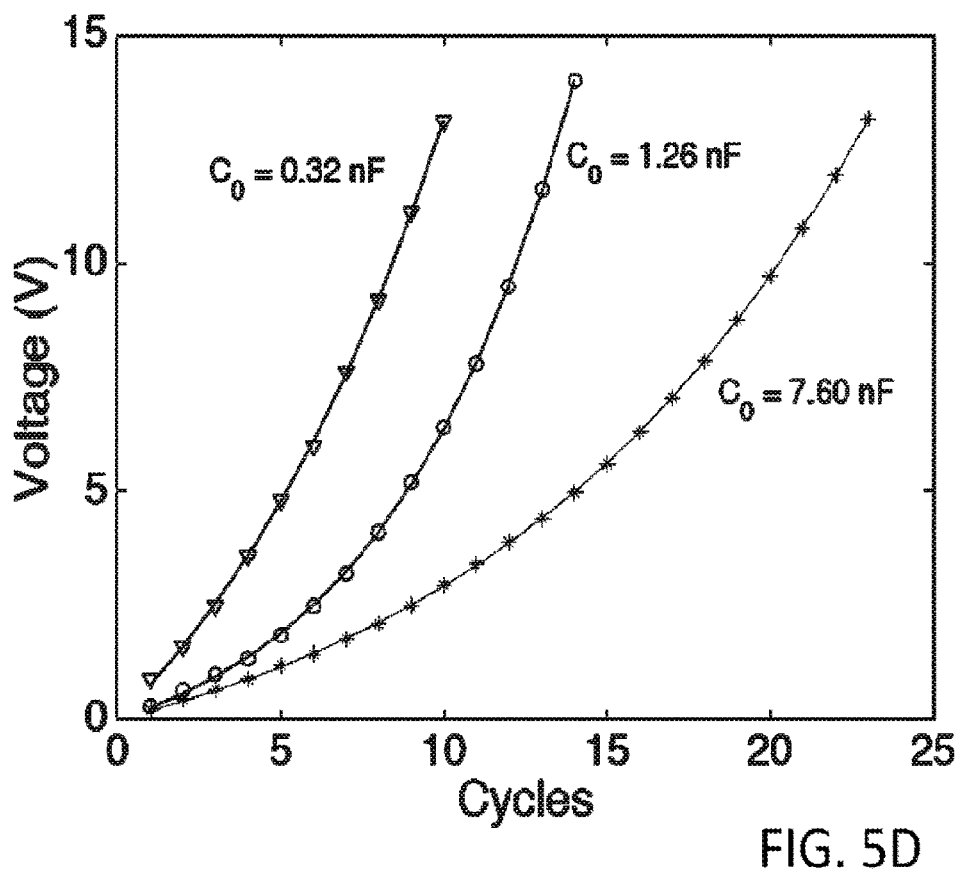
FIG. 5D is a plot of voltage versus cycles illustrating energy growth using an ambient energy harvesting apparatus incorporating four moveable water droplet-based variable capacitors as sink capacitors.

FIG. 5C is a plot of voltage versus cycles illustrating energy growth using an ambient energy harvesting apparatus incorporating two moveable water droplet-based variable capacitors as sink capacitors. FIG. 5D is a plot of voltage versus cycles illustrating energy growth using an ambient energy harvesting apparatus incorporating four moveable water droplet-based variable capacitors as sink capacitors. It is noted that for FIGS. 5C and 5D, the ambient energy harvesting apparatus 400 had a tilting angle of the wafer within ±5°, which indicates that the total input energy, equal to the potential energy of the drops, was 15.4 µJ in a round trip of three water drops. Therefore, if immediately before the voltage reaches the breakdown threshold, the exact amount of energy is removed from the source capacitor such that the voltage in the next cycle is just below the breakdown voltage, the generator with three water drops can harvest 1.2 µJ per cycle, corresponding to a harvesting efficiency of 7.9%.

Figure 6A:
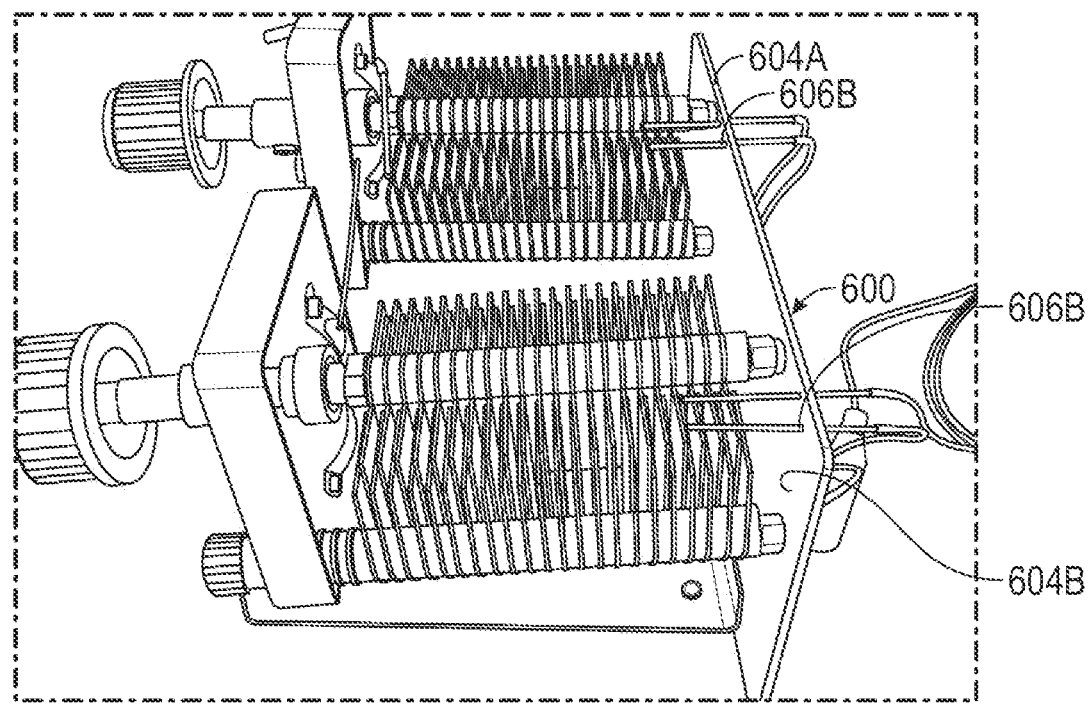
FIG. 6A is a perspective view illustration of an ambient energy harvesting apparatus according to another embodiment using two variable capacitors that are connected in series.
Figure 6B:
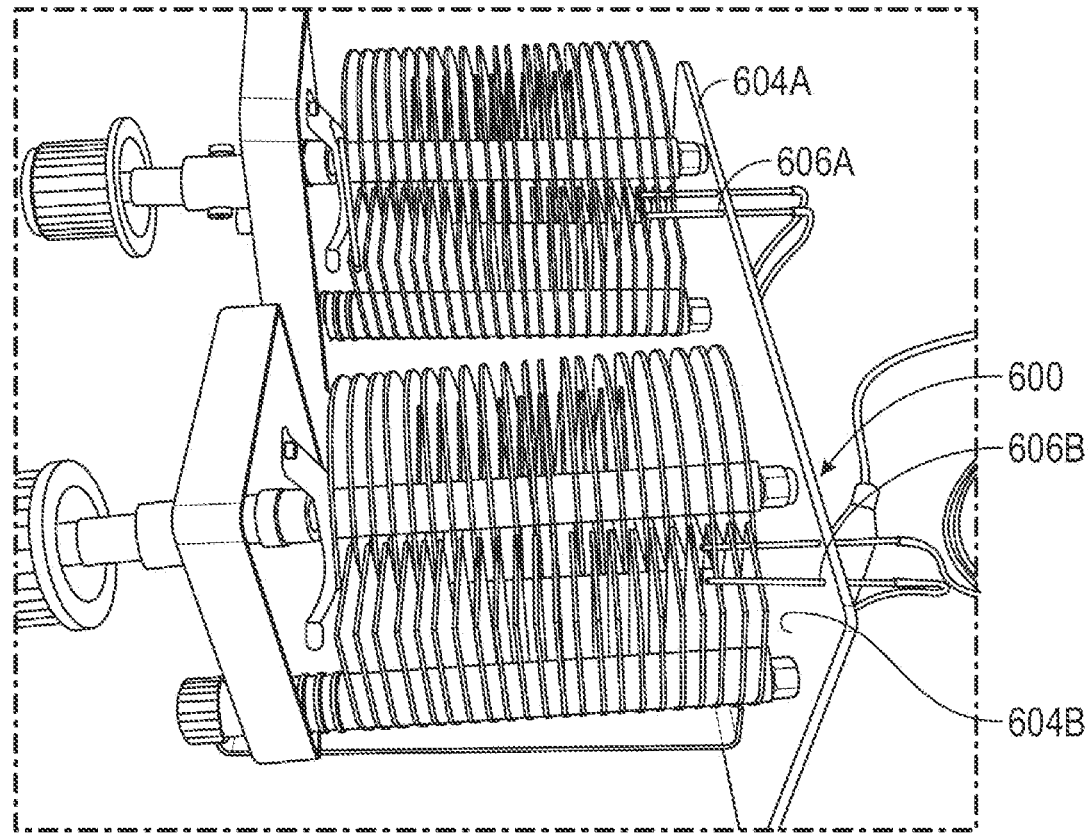
FIG. 6B is a perspective view illustration of an ambient energy harvesting apparatus similar to the apparatus of FIG. 6A, but with the two variable capacitors being connected in parallel.

FIG. 6A is a perspective view illustration of an ambient energy harvesting apparatus 600 according to another embodiment using two variable capacitors 604A, 604B that are connected in series. Capacitance of the variable capacitors 604A, 604B may be adjusted by rotation of aluminum physical contacts 606. FIG. 6B is a perspective view illustration of an ambient energy harvesting apparatus similar to the apparatus of FIG. 6A, but with the two variable capacitors 604A, 604B connected in parallel. In particular, the variable capacitors 604A, 604B are parallel-plate variable capacitors using air as the dielectric, in which the effects of charge trapping and electrostatic induction are negligible. The source capacitor (not shown) may include a ceramic capacitor. The capacitances of the variable capacitors 604A, 604B could be mechanically changed from 57 pF to 314 pF, respectively. The three aluminum physical contacts 606 were used in each capacitor 604A, 604B to realize the two configurations as the capacitors were rotated to the positions associated with the high and low capacitances.

A cycle included the following four steps (1) to (4). (1) The sinks were connected in series and had a maximum capacitance of 314 pF. The system 600 was in the duplicative state with charging owing from the source to the sinks 604A, 604B because of electrostatic induction. (2) The sinks 604A, 604B were disconnected and the capacitances of the sinks 604A, 604B were adjusted to the minimum value (i.e. 57 pF). (3) The sinks 604A, 604B were connected in parallel. The system 600 was in the distributive state with charges owing to the source. (4) The sinks were disconnected and the capacitances were adjusted back to the maximum value. Note that because of the positive feedback mechanism, the initial discharged state is not stable. Any arbitrarily small disturbances will lead to exponential growth of the charges in the system.

Figure 6C:
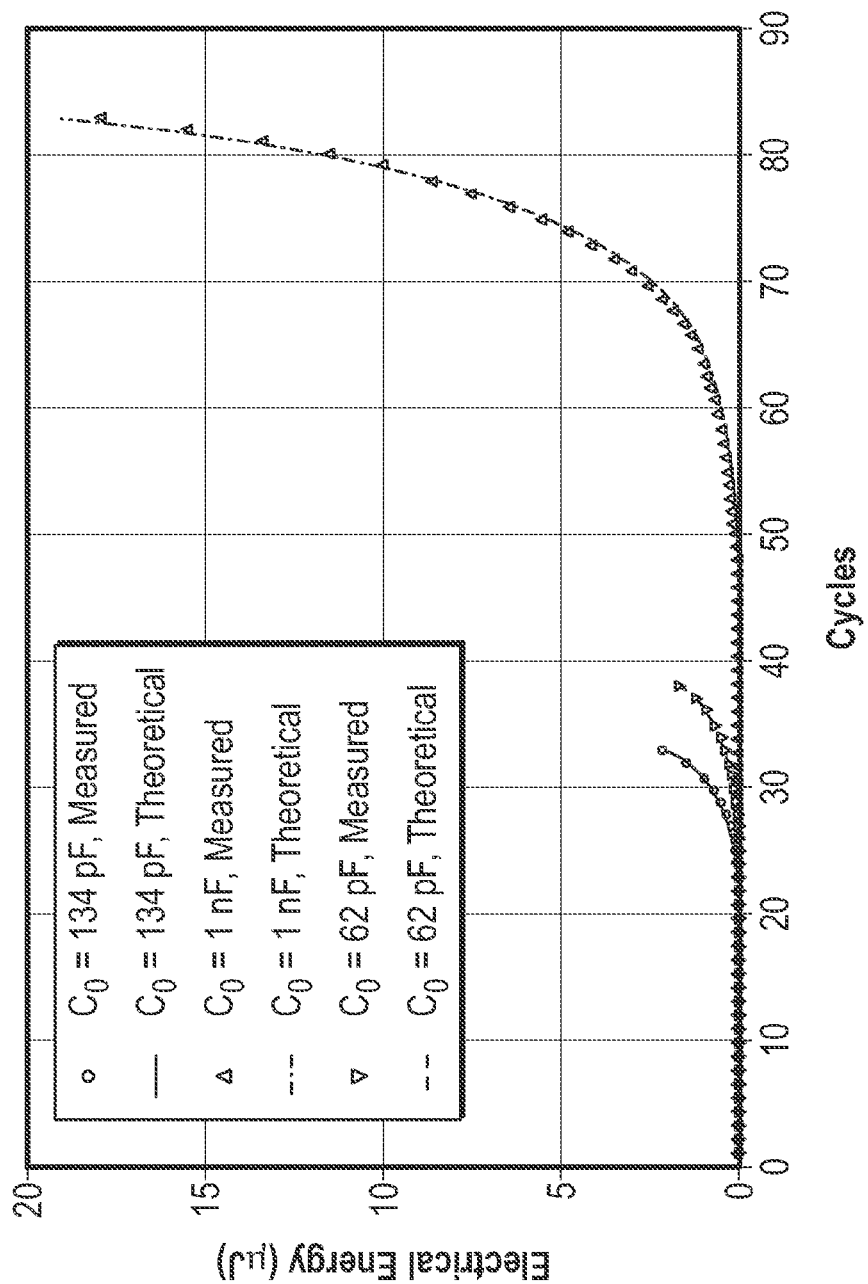
FIG. 6C is a plot of electrical energy ($\mu J$) versus cycles including both measured data points and predicted lines, illustrating harvested energy stored for three cases with different source capacitors using the ambient energy harvesting apparatus of FIGS. 6A-6B.
Figure 6D:
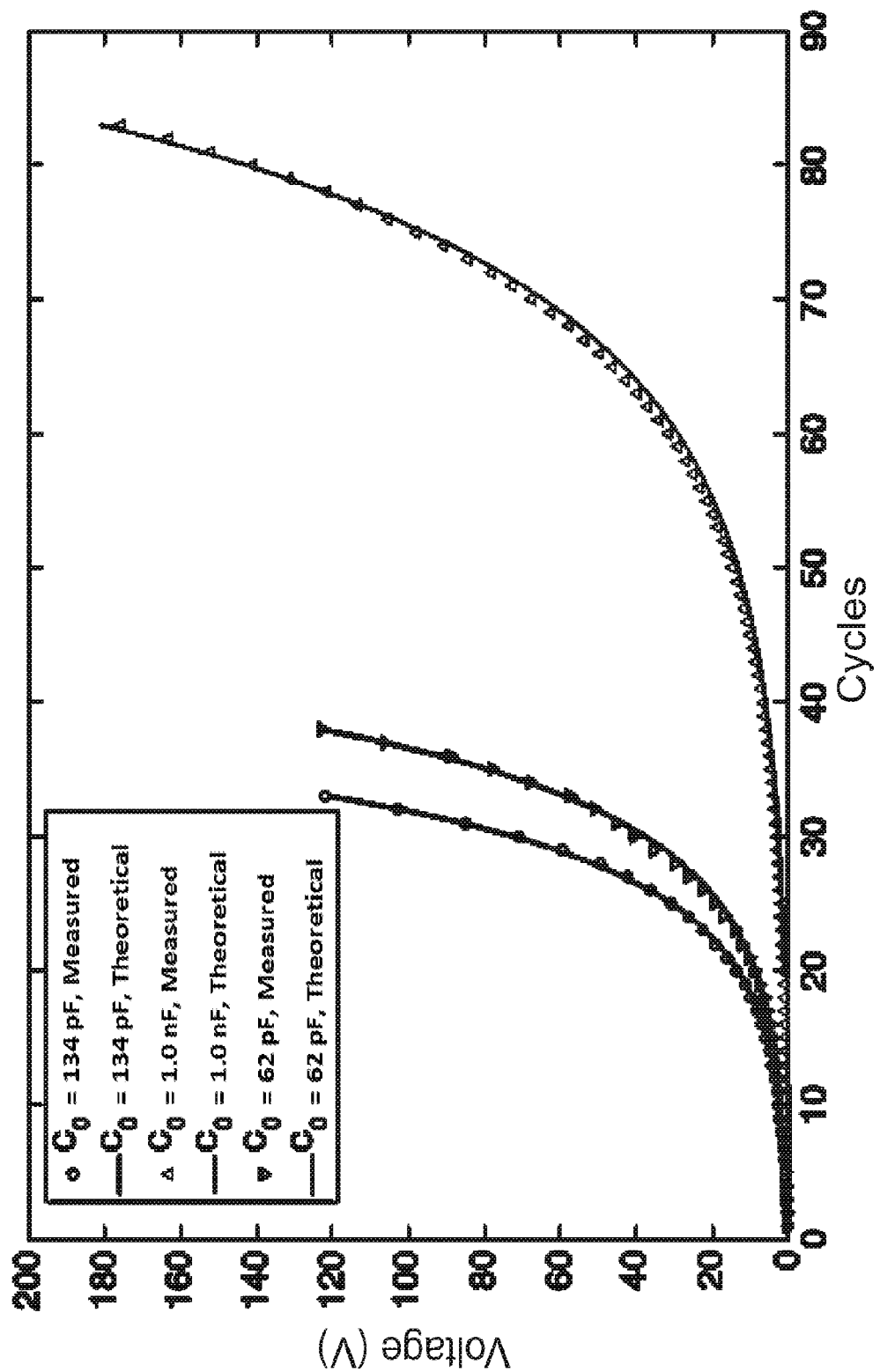
FIG. 6D is a plot of voltage (V) versus cycles illustrating energy growth for three cases with different source capacitors using the ambient energy harvesting apparatus of FIGS. 6A-6B.
Figure 6E:
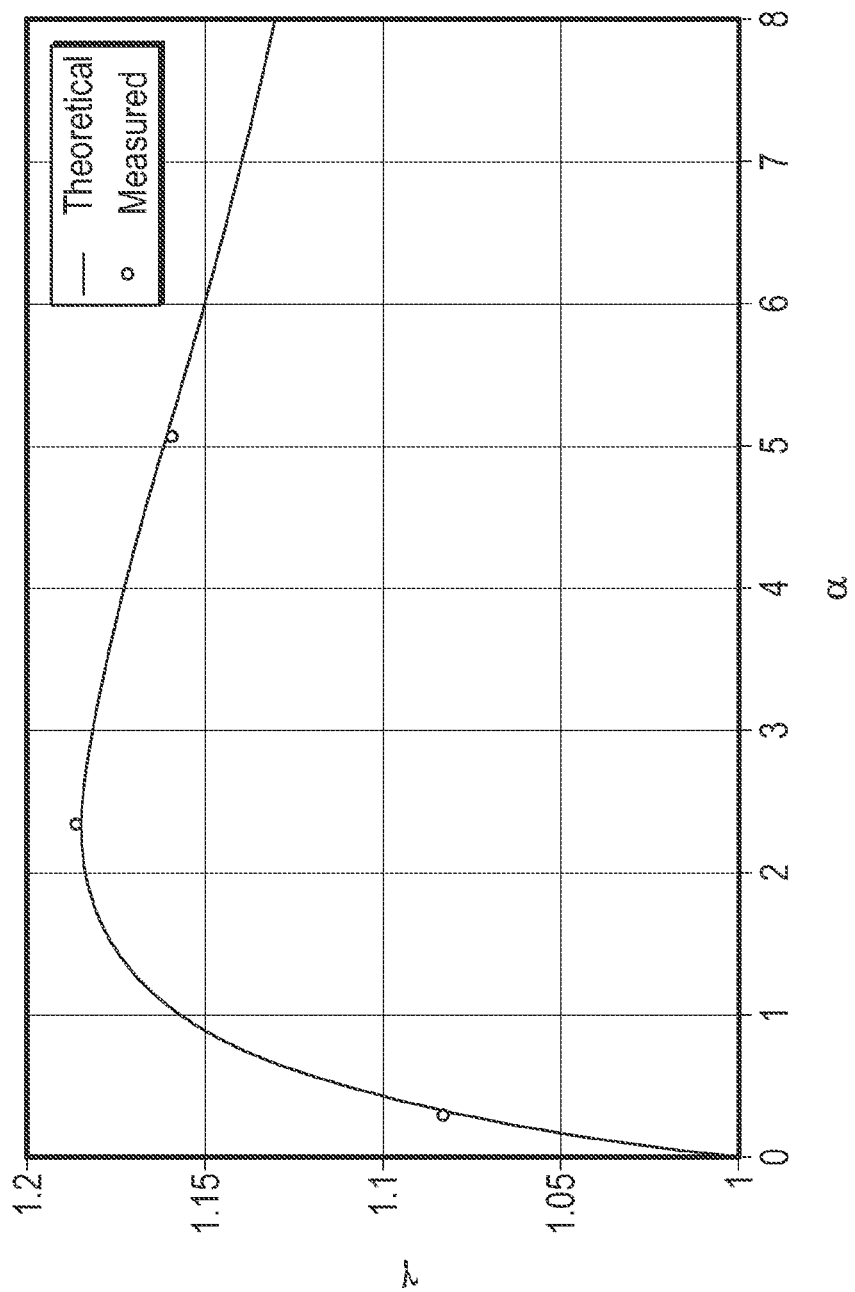
FIG. 6E is a plot of experimentally obtained loop gains versus theoretical values of loop gains utilizing the ambient energy harvesting apparatus of FIGS. 6A-6B.

FIG. 6C is a plot of electrical energy (µJ) versus cycles illustrating harvested energy stored in different source capacitors using the ambient energy harvesting apparatus 600 of FIG. 6A. In particular the different source capacitors were 134 pF, 1.0 nF, and 62 pF, respectively. As shown, harvested energy starts at a near-zero level, but eventually increases dramatically in an exponential manner, and measured energy levels closely tracked theoretically predicted harvested energy levels. FIG. 6D is a plot of voltage (V) versus cycles for three cases with different source capacitors using the ambient energy harvesting apparatus 600 of FIG. 6A. In particular the different source capacitors were 134 pF, 1.0 nF, and 62 pF, respectively. FIG. 6E plot of experimentally obtained loop gains versus theoretical values of loop gains utilizing the ambient energy harvesting apparatus of FIGS. 6A-6B. As shown, loop gains as measured closely tracked theoretically predicted loop gains.

FIGS. 7A-7D are cross-sectional views of an ambient energy harvesting apparatus 700 according to another embodiment configured to harvest energy from salinity differences, with the apparatus 700 being in our different operational phases in the respective FIGS. 7A-7D. The energy harvesting apparatus 700 includes a storage capacitor 702, a first electrical double-layer capacitor (EDLC) 704A, and a second EDLC 704B. The first and second EDLC 704A, 704B are formed from four electrodes 706A-706D (e.g., porous carbon electrodes).

Figure 7A:
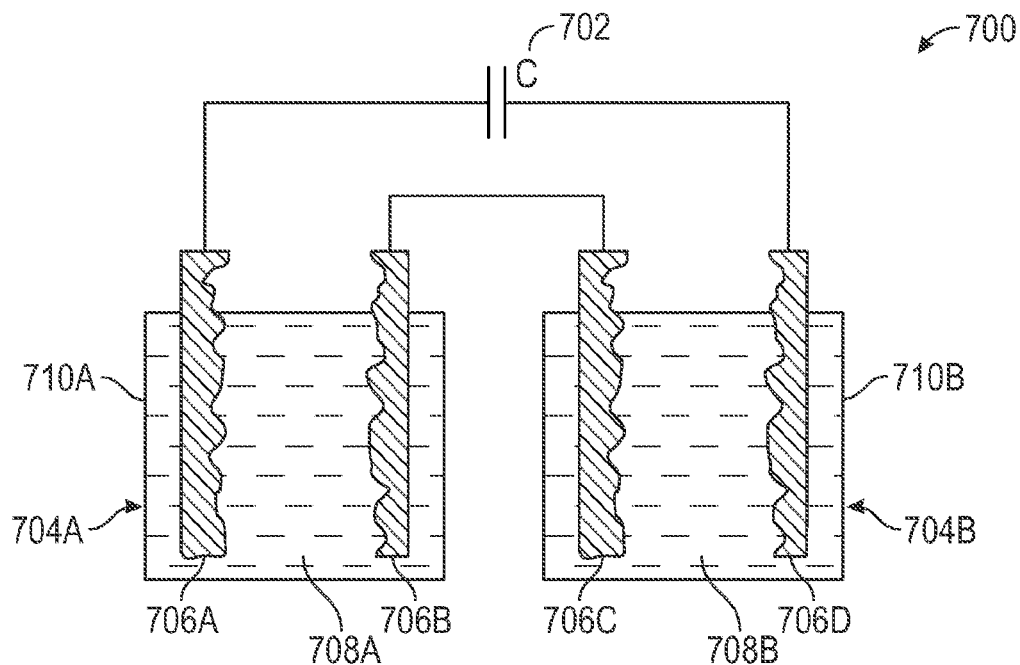
FIG. 7A is a cross-sectional view illustration of an ambient energy harvesting apparatus according to another embodiment configured to harvest energy from salinity differences, with the apparatus being in a first operational phase including two or more capacitors connected in series and placed in saltwater.
Figure 7B:
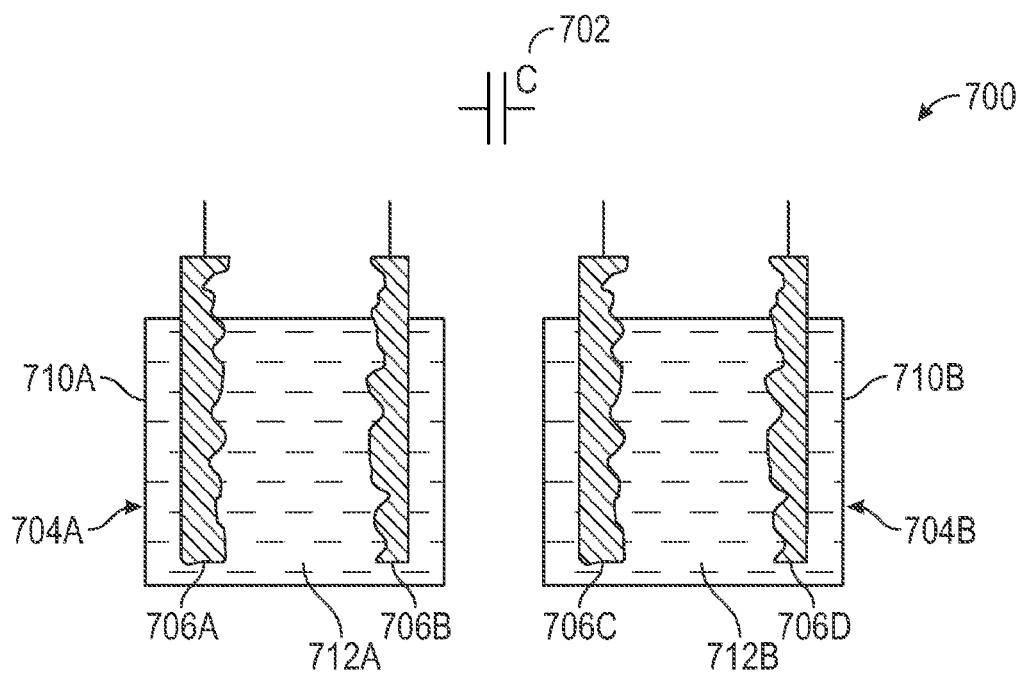
FIG. 7B is a cross-sectional view illustration of the ambient energy harvesting apparatus of FIG. 7A in a second operational phase with two or more capacitors disconnected and with saltwater replaced with freshwater.

FIG. 7A shows the ambient energy harvesting apparatus 700 in a first operational phase, with two or more capacitors 704A, 704B connected in series with one another, and being placed in saltwater 708A, 708B together with a storage capacitor 702. The first EDLC 704A includes first and second electrodes 706A, 706B in saltwater 708A within a first container 710A. The second EDLC 704B includes third and fourth electrodes 706C, 706D in saltwater 708B within a second container 710B. Charges flow from the storage capacitor 702 to the EDLCs 704A, 704B due to electrostatic induction. FIG. 7B is a cross-sectional view of the ambient energy harvesting apparatus 700 in a second operational phase, in which two or more capacitors 704A, 704B are disconnected and the saltwater is replaced with freshwater 712A, 712B. Because of the resulting low salt concentration, the capacitances of the EDLCs 704A, 704B are reduced, and consequently, the voltage across the EDLCs 704A, 704B increases.

Figure 7C:
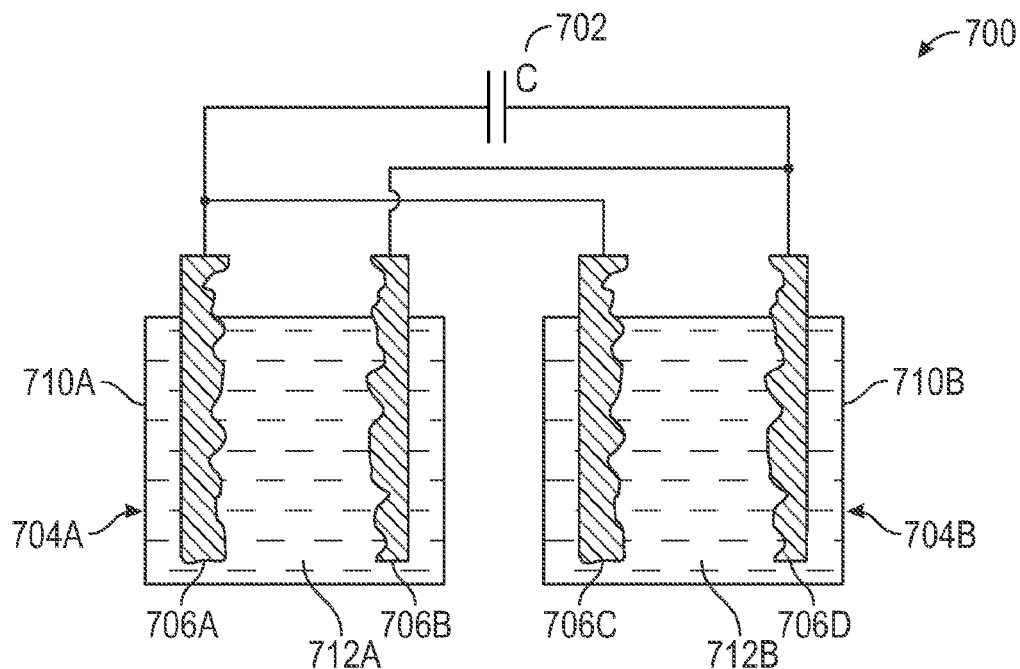
FIG. 7C is a cross-sectional view illustration of the ambient energy harvesting apparatus of FIG. 7A in a third operational phase with two or more capacitors connected in parallel and being placed in freshwater.
Figure 7D:
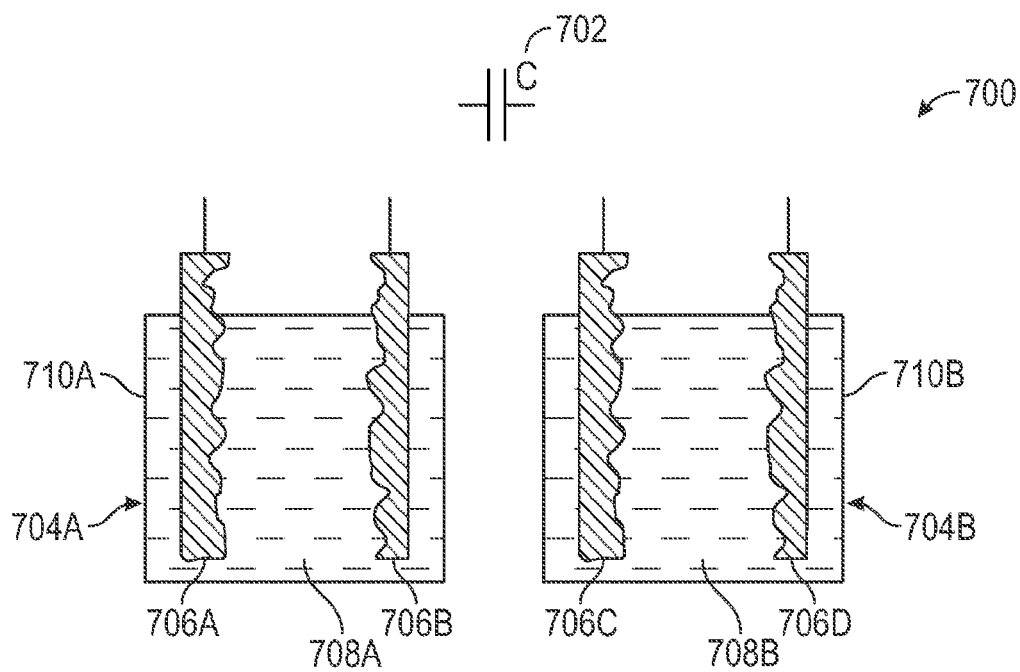
FIG. 7D is a cross-sectional view illustration of the ambient energy harvesting apparatus of FIG. 7A in a fourth operational phase with two or more capacitors that are disconnected and with freshwater being replaced with saltwater.

FIG. 7C is a cross-sectional view of the ambient energy harvesting apparatus 700 in a third operational phase in which two or more capacitors 704A, 704B are connected in parallel and placed in freshwater 712A, 712B. The total charges increase because of the change of connectivity. Because the capacitances of the EDLCs 704A, 704B are at a lower level, charges flow to the storage capacitor 702. FIG. 7D is a cross-sectional view of the ambient energy harvesting apparatus 700 in a fourth operational phase in which two or more capacitors 704A, 704B are disconnected and freshwater 712A, 712B is replaced with saltwater 708A, 708B.

It is not necessary to use external sources to charge the storage capacitor 702 or the EDLCs 704A, 704B. Because of the inherent positive feedback mechanism, any arbitrarily small amount of charges on the storage capacitor 702 and/or EDLCs 704A, 704B (e.g., from environmental disturbances, contact electrification, etc.) is sufficient to start exponential charge accumulation, as discussed above.

Figure 8A:
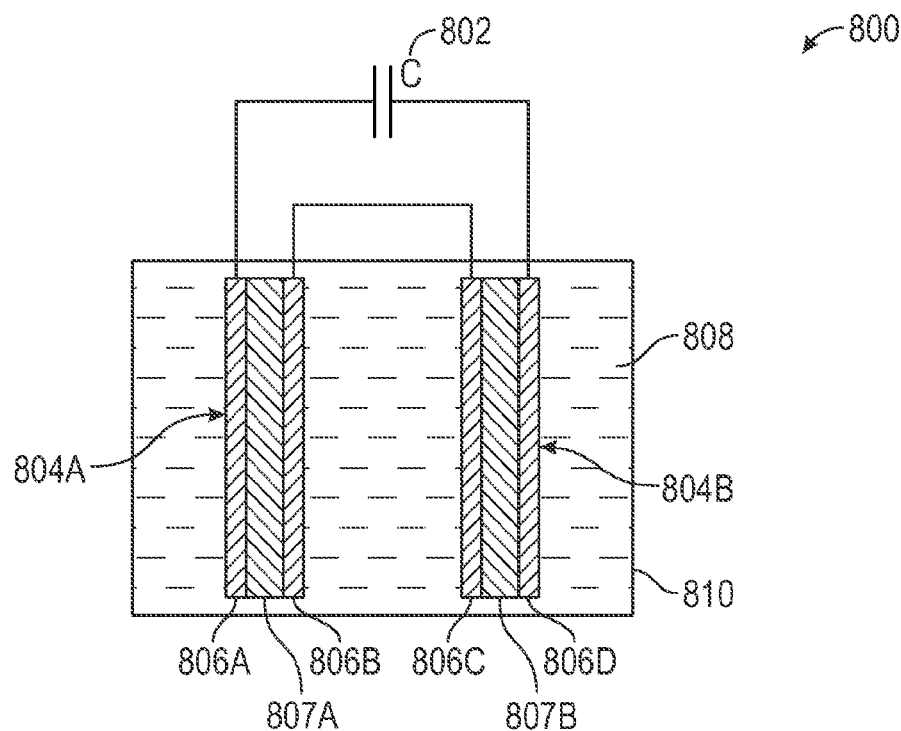
FIG. 8A is a cross-sectional view illustration of an ambient energy harvesting apparatus according to another embodiment configured to harvest energy from thermal energy, with the apparatus being in a first operational phase with two or more capacitors immersed in a hot liquid.

FIGS. 8A-8D are cross-sectional views of an ambient energy harvesting apparatus 800 according to another embodiment configured to harvest energy from thermal energy, with FIGS. 8A-8A showing the ambient energy harvesting apparatus 800 in four different operational states, respectively. The dielectric constants of most piezoelectric materials are temperature dependent. For example, between 25° C. to 150° C. the dielectric constant of unpoled 0.29PIN-0.44PM-0.27PT is proportional to the temperature. Therefore, the capacitance values of capacitors fabricated with this material as dielectric vary with temperature. Such variable capacitors can be used to harvest thermal energy. The ambient energy harvesting apparatus 800 includes a storage capacitor 802 and at least two PIN-PMN-PT capacitors 804A, 804B. The ambient energy harvesting apparatus 800 further includes silicone oil 808; however, it is noted that other insulating materials that do not chemically react with the materials of the capacitors 804A, 804B can be used for the same purpose.

FIG. 8A shows the ambient energy harvesting apparatus 800 in a first operational phase in which two or more sink capacitors 804A, 804B connected in series with each other, and being immersed, together with the storage capacitor 802, in a hot liquid 808 (e.g., silicone oil) contained within a container 810. In certain embodiments, the first capacitor 804A may be a PMN-PT (lead magnesium niobate-lead titanate) capacitor fabricated by depositing first and second electrodes 806A, 806B on both sides of PIN-PMN-PT (lead indium niobate-lead magnesium niobate-lead titanate) single crystal thin films 807A. The second capacitor 804B is a PMN-PT (lead magnesium niobate-lead titanate) capacitor fabricated by depositing third and fourth electrodes 806C, 806D on both sides of PIN-PMN-PT (lead indium niobate-lead magnesium niobate-lead titanate) single crystal thin films 807B. Charges flow to the sink capacitors 804A, 804B when the ambient energy harvesting apparatus 800 is in the first operational state.

Figure 8B:
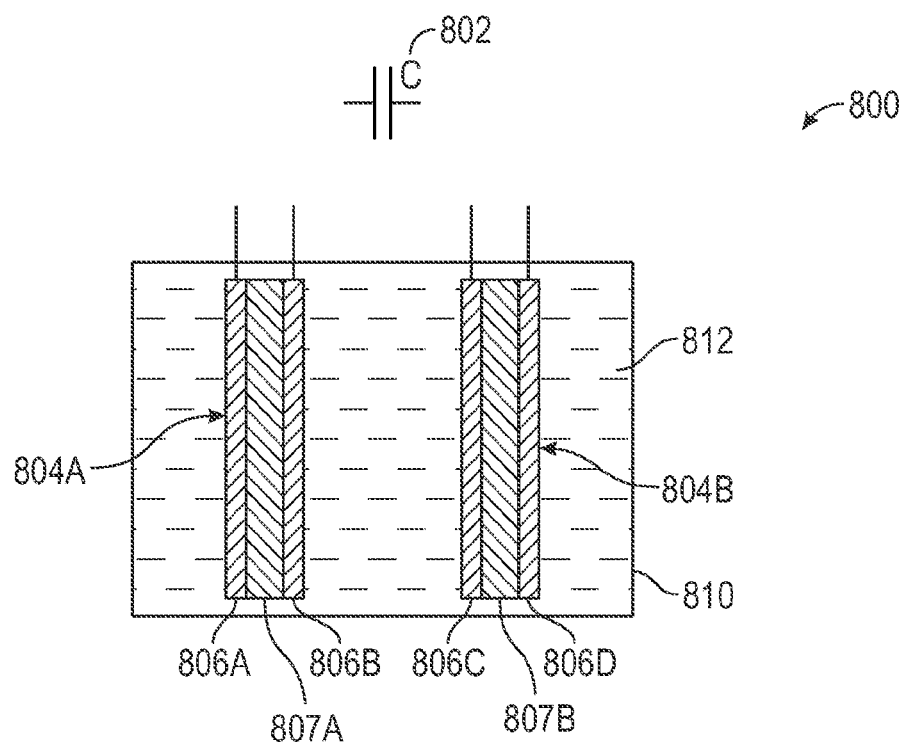
FIG. 8B is a cross-sectional view illustration of the ambient energy harvesting apparatus of FIG. 8A in a second operational phase with two or more capacitors disconnected and the hot liquid being replaced with cold liquid.

FIG. 8B shows the ambient energy harvesting apparatus 800 in the second operational state, in which two or more capacitors 804A, 804B are disconnected and the hot liquid 808 is replaced with a cold liquid 812. Because of the resulting low temperature, the capacitances of the sink capacitors 804A, 804B are reduced and consequently, the voltage across the sink capacitors 804A, 804B increases.

Figure 8C:
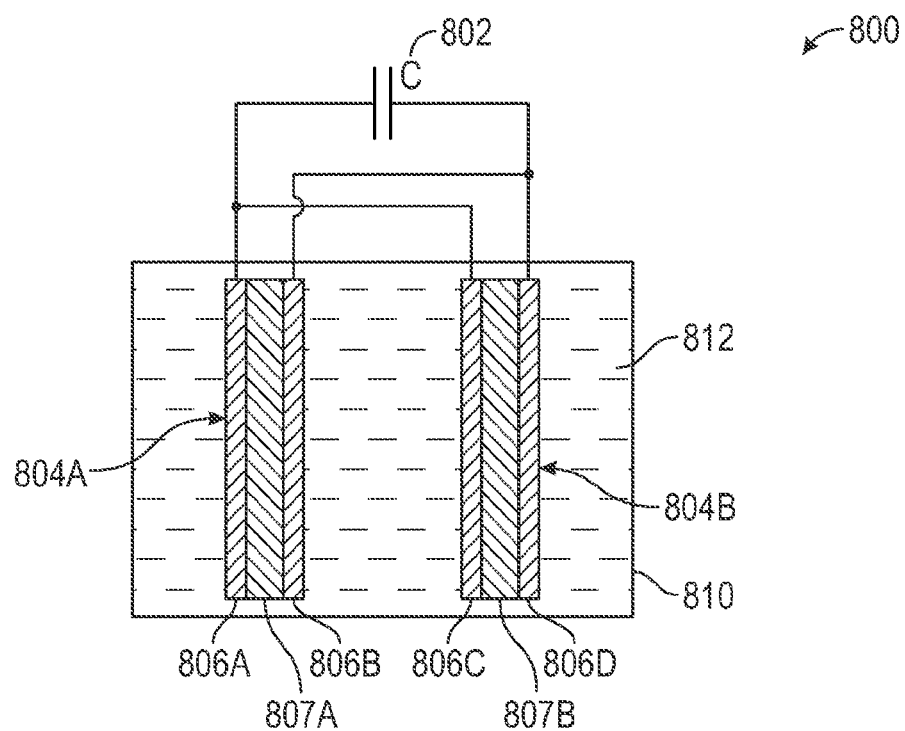
FIG. 8C is a cross-sectional view illustration of the ambient energy harvesting apparatus of FIG. 8A in a third operational phase with two or more capacitors connected in parallel and being immersed in the cold liquid.

FIG. 8C shows the ambient energy harvesting apparatus 800 in the third operational state, in which two or more capacitors 804A, 804B are connected in parallel and are immersed in a cold liquid 812. The total charges increase because of the change in connectivity. Because the capacitances of the sinks 804A, 804B are at a lower level, charges flow to the storage capacitor 802.

Figure 8D:
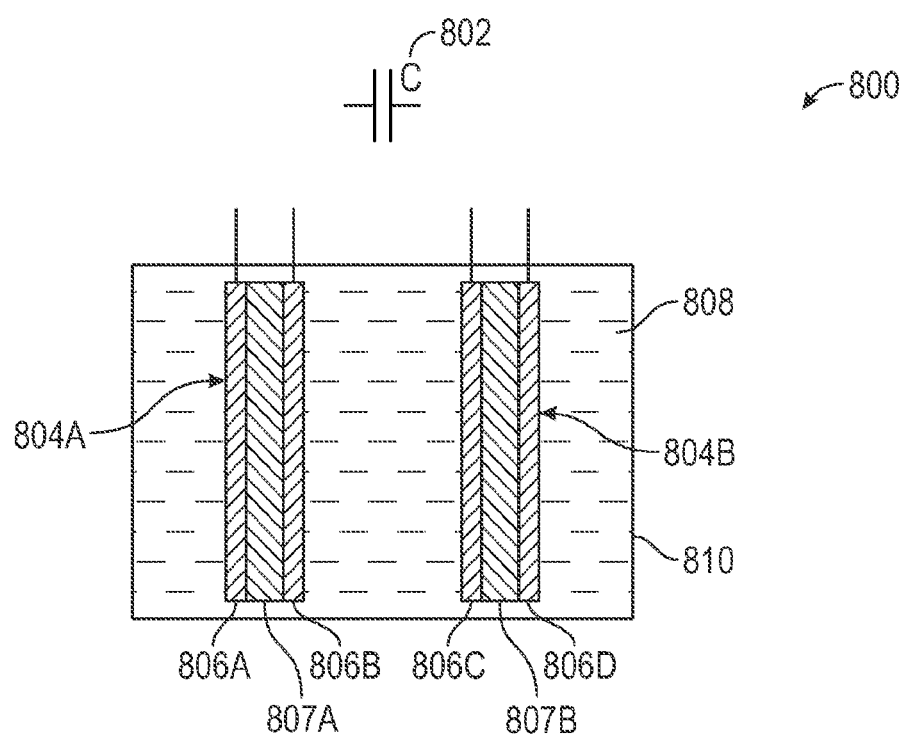
FIG. 8D is a cross-sectional view illustration of the ambient energy harvesting apparatus of FIG. 8A in a fourth operational phase with two or more capacitors disconnected and the cold liquid being replaced with hot liquid.

FIG. 8D shows the ambient energy harvesting apparatus 800 in a fourth operational state, in which two or more capacitors 804A, 804B are disconnected, and the cold liquid 812 is replaced with the hot liquid 808.

Figure 9:
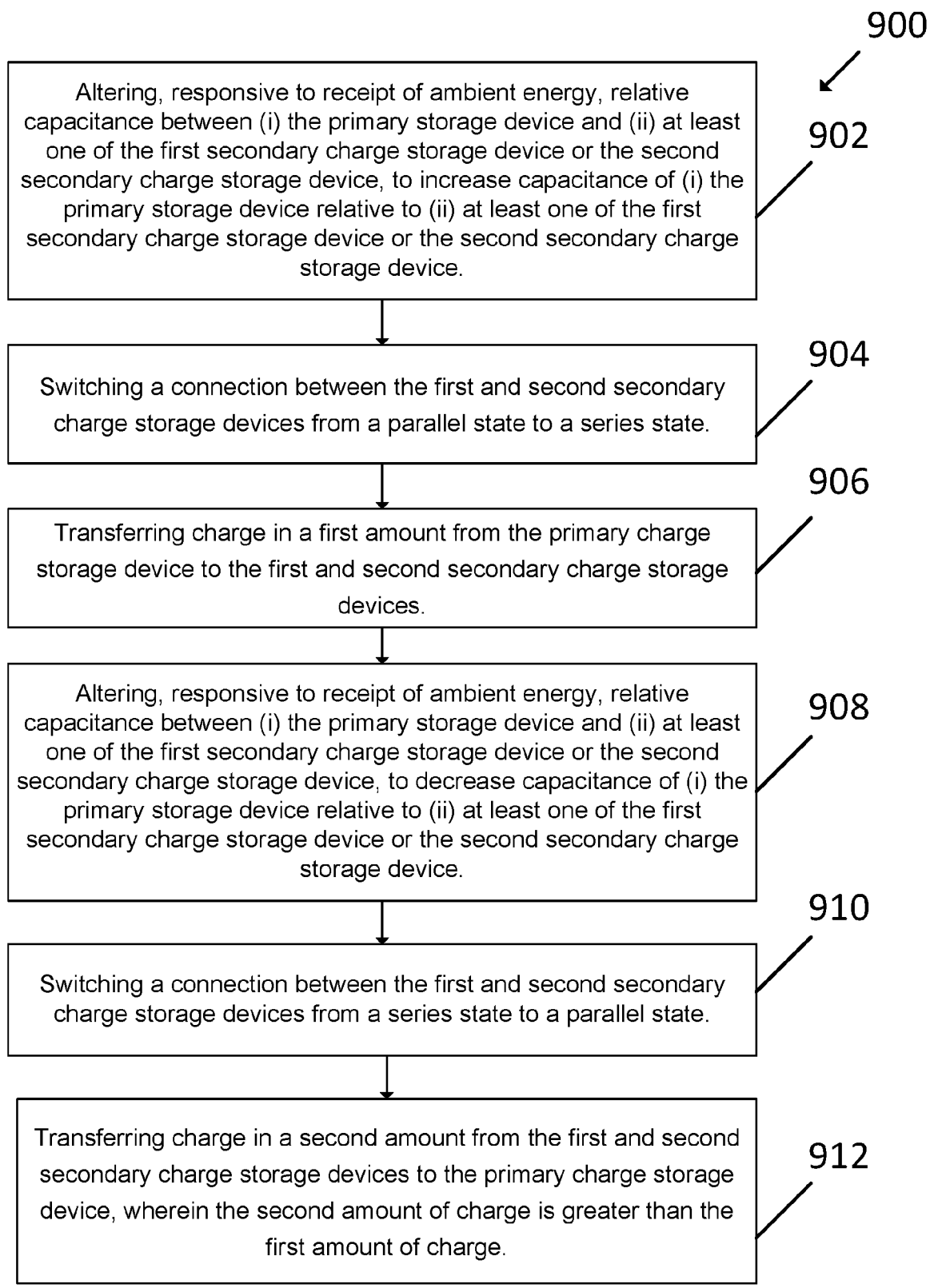
FIG. 9 is a flowchart outlining steps of a method for harvesting ambient energy by circuit reconfiguration according to certain embodiments.

FIG. 9 is a flowchart illustrating steps 902-912 of a method 900 for harvesting ambient energy utilizing a primary storage device, a first secondary charge storage device, and a second secondary charge storage device. Step 902 includes altering, in response to receipt of ambient energy, relative capacitance between (i) the primary storage device and (ii) at least one of the first secondary charge storage device or the second secondary charge storage device, to increase capacitance of (i) the primary storage device relative to (ii) at least one of the first secondary charge storage device or the second secondary charge storage device. It is noted that the capacitance of the primary charge storage device may be increased, the capacitance of the first secondary charge storage device may be decreased, and/or the capacitance of the second secondary charge storage device may be decreased). Step 904 includes switching a connection between the first and second secondary charge storage devices from a parallel state to a series state. Step 906 includes transferring charge in a first amount from the primary charge storage device to the first and second secondary charge storage devices. Step 908 includes altering, in response to receipt of ambient energy, relative capacitance between (i) the primary storage device and (ii) at least one of the first secondary charge storage device or the second secondary charge storage device, to decrease capacitance of (i) the primary storage device relative to (ii) at least one of the first secondary charge storage device or the second secondary charge storage device. It is noted that the capacitance of the primary charge storage device may be decreased, the capacitance of the first secondary charge storage device may be increased, and/or the capacitance of the second secondary charge storage device may be increased (i.e., in a manner generally opposite to step 902). Step 910 includes switching a connection between the first and second secondary charge storage devices from a series state to a parallel state. Finally, 912 includes transferring charge in a second amount from the first and second secondary charge storage devices to the primary charge storage device, wherein the second amount of charge is greater than the first amount of charge.

Those skilled in the art will recognize improvements and modifications to the exemplary embodiments of the present disclosure. All such improvements and modifications are considered within the scope of the concepts disclosed herein and the claims that follow.

What is claimed is:

1. An apparatus for harvesting ambient energy, the apparatus comprising:
    a primary charge storage device;
    a first secondary charge storage device;
    a second secondary charge storage device;
    switching circuitry adapted to cyclically alter connection of the first and second secondary charge storage devices between a series state and a parallel state;
    wherein at least one of the primary storage device, the first secondary charge storage device, or the second secondary charge storage device comprises a capacitance that varies in response to receipt of ambient energy;
    wherein the apparatus is configured to accumulate, in the primary charge storage device, charge received from the first and second secondary charge storage devices when connected in the parallel state; and
    wherein the apparatus is configured to accumulate, in the first and second secondary charge storage devices when connected in the series state, charge received from the primary charge storage device.

2. The apparatus of claim 1, wherein at least one of the primary charge storage device, the first secondary charge storage device, or the second secondary charge storage device comprises a capacitor.

3. The apparatus of claim 1, wherein the primary charge storage device comprises a capacitance that varies in response to receipt of ambient energy.

4. The apparatus of claim 1, wherein at least one of the first secondary charge storage device or the second secondary charge storage device comprises a capacitance that varies in response to receipt of ambient energy.

5. The apparatus of claim 1, wherein each of the first secondary charge storage device and the second secondary charge storage device comprises a capacitance that varies in response to receipt of ambient energy.

6. The apparatus of claim 1, wherein each of the primary charge storage device, the first secondary charge storage device, and the second secondary charge storage device comprises a capacitance that varies in response to receipt of ambient energy.

7. The apparatus of claim 1, wherein transition between the series state and the parallel state of the switching circuitry is responsive to an electrical signal.

8. The apparatus of claim 1, wherein transition between the series state and the parallel state of the switching circuitry is responsive to a non-electrical input.

9. The apparatus of claim 8, wherein the non-electrical input is derived from the ambient energy.

10. The apparatus of claim 1, wherein the switching circuitry comprises first and second moveable electrically conductive elements.

11. The apparatus of claim 10, wherein the first and second moveable electrically conductive elements comprise electrically conductive liquid droplets.

12. The apparatus of claim 11, wherein each of the first and second moveable electrically conductive liquid droplets move in response to receipt of ambient energy.

13. The apparatus of claim 11, wherein the electrically conductive liquid droplets comprise water or mercury.

14. The apparatus of claim 1, being configured for harvesting ambient energy comprising mechanical or acoustic vibrations.

15. The apparatus of claim 1, being configured for harvesting ambient energy comprising thermal energy.

16. The apparatus of claim 1, being configured for harvesting ambient energy comprising electrochemical energy.

17. A method for harvesting ambient energy utilizing a primary storage device, a first secondary charge storage device, and a second secondary charge storage device, the method comprising:
    altering, in response to receipt of ambient energy, relative capacitance between (i) the primary storage device and (ii) at least one of the first secondary charge storage device or the second secondary charge storage device, to increase capacitance of (i) the primary storage device relative to (ii) at least one of the first secondary charge storage device or the second secondary charge storage device;
    switching a connection between the first and second secondary charge storage devices from a parallel state to a series state;
    transferring charge in a first amount from the primary charge storage device to the first and second secondary charge storage devices;
    altering, in response to receipt of ambient energy, relative capacitance between (i) the primary storage device and (ii) at least one of the first secondary charge storage device or the second secondary charge storage device, to decrease capacitance of (i) the primary storage device relative to (ii) at least one of the first secondary charge storage device or the second secondary charge storage device;
    switching a connection between the first and second secondary charge storage devices from a series state to a parallel state; and
    transferring charge in a second amount from the first and second secondary charge storage devices to the primary charge storage device, wherein the second amount of charge is greater than the first amount of charge.

18. The method of claim 17, wherein:
    the altering of relative capacitance between (i) the primary charge storage device and (ii) at least one of the first secondary charge storage device or the second secondary charge storage device, to increase capacitance of (i) the primary storage device relative to (ii) at least one of the first secondary charge storage device or the second secondary charge storage device, comprises increasing capacitance of the primary charge storage device; and
    the altering of relative capacitance between (i) the primary storage device and (ii) at least one of the first secondary charge storage device or the second secondary charge storage device, to decrease capacitance of (i) the primary storage device relative to (ii) at least one of the first secondary charge storage device or the second secondary charge storage device, comprises decreasing capacitance of the primary charge storage device.

19. The method of claim 17, wherein:

the altering of relative capacitance between (i) the primary charge storage device and (ii) at least one of the first secondary charge storage device or the second secondary charge storage device, to increase capacitance of (i) the primary storage device relative to (ii) at least one of the first secondary charge storage device or the second secondary charge storage device, comprises decreasing capacitance of at least one of the first secondary charge storage device or the second secondary charge storage device; and the altering of relative capacitance between (i) the primary storage device and (ii) at least one of the first secondary charge storage device or the second secondary charge storage device, to decrease capacitance of (i) the primary storage device relative to (ii) at least one of the first secondary charge storage device or the second secondary charge storage device, comprises increasing capacitance of at least one of the first secondary charge storage device or the second secondary charge storage device.

20. The method of claim 17, wherein:

the altering of relative capacitance between (i) the primary charge storage device and (ii) at least one of the first secondary charge storage device or the second secondary charge storage device, to increase capacitance of (i) the primary storage device relative to (ii) at least one of the first secondary charge storage device or the second secondary charge storage device, comprises decreasing capacitance of both of the first secondary charge storage device and the second secondary charge storage device; and the altering of relative capacitance between (i) the primary storage device and (ii) at least one of the first secondary charge storage device or the second secondary charge storage device, to decrease capacitance of (i) the primary storage device relative to (ii) at least one of the first secondary charge storage device or the second secondary charge storage device, comprises increasing capacitance of both of the first secondary charge storage device and the second secondary charge storage device.

* * * * *